United States Patent
Park et al.

(10) Patent No.: US 12,524,937 B2
(45) Date of Patent: Jan. 13, 2026

(54) TEXT-BASED IMAGE GENERATION

(71) Applicant: ADOBE INC., San Jose, CA (US)

(72) Inventors: Taesung Park, San Francisco, CA (US); Minguk Kang, Pohang-si (KR); Richard Zhang, Burlingame, CA (US); Junyan Zhu, Pittsburgh, PA (US); Elya Shechtman, Seattle, WA (US); Sylvain Paris, Jamaica Plain, MA (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 18/170,963

(22) Filed: Feb. 17, 2023

(65) Prior Publication Data

US 2024/0282025 A1  Aug. 22, 2024

(51) Int. Cl.
| | |
|---|---|
| *G06T 11/60* | (2006.01) |
| *G06F 40/126* | (2020.01) |
| *G06F 40/151* | (2020.01) |
| *G06F 40/284* | (2020.01) |
| *G06T 5/20* | (2006.01) |

(52) U.S. Cl.
CPC ............ *G06T 11/60* (2013.01); *G06F 40/126* (2020.01); *G06F 40/151* (2020.01); *G06F 40/284* (2020.01); *G06T 5/20* (2013.01); *G06T 2207/20004* (2013.01); *G06T 2207/20081* (2013.01); *G06T 2207/20084* (2013.01)

(58) Field of Classification Search
CPC . G06T 11/60; G06T 5/20; G06T 2207/20004; G06T 2207/20081; G06T 2207/20084; G06T 11/001; G06F 40/126; G06F 40/151; G06F 40/284
See application file for complete search history.

(56) References Cited

U.S. PATENT DOCUMENTS

| | | |
|---|---|---|
| 10,713,821 B1 | 7/2020 | Surya et al. |
| 2017/0024855 A1 | 1/2017 | Liang et al. |
| 2018/0240257 A1* | 8/2018 | Li .................... G06V 10/774 |
| 2020/0242823 A1* | 7/2020 | Gehlaut ............... G06T 11/40 |
| 2020/0242964 A1 | 7/2020 | Wu |
| 2022/0038620 A1* | 2/2022 | Demers ............... G06V 10/764 |
| 2022/0108417 A1* | 4/2022 | Liu .................... G06T 1/0007 |
| 2022/0114698 A1* | 4/2022 | Liu .................... G06T 3/04 |

(Continued)

FOREIGN PATENT DOCUMENTS

| | | | | |
|---|---|---|---|---|
| CN | 111062865 A | * | 4/2020 | ............... G06N 3/04 |
| KR | 10-2021-0121537 A | | 10/2021 | |
| WO | WO2022156350 A1 | | 7/2022 | |

OTHER PUBLICATIONS

Li, et al., "Text to Realistic Image Generation with Attentional Concatenation Generative Adversarial Networks", Discrete Dynamics in Nature and Society, vol. 2020, Article ID 6452536, 10 pages. (Year: 2020).*

(Continued)

*Primary Examiner* — Michael Le
(74) *Attorney, Agent, or Firm* — F. CHAU & ASSOCIATES, LLC

(57) ABSTRACT

Systems and methods for image generation are provided. An aspect of the systems and methods includes obtaining a text prompt, generating a style vector based on the text prompt, generating an adaptive convolution filter based on the style vector, and generating an image corresponding to the text prompt based on the adaptive convolution filter.

20 Claims, 15 Drawing Sheets

(56) References Cited

U.S. PATENT DOCUMENTS

| | | | |
|---|---|---|---|
| 2022/0130499 A1 | 4/2022 | Zhou et al. | |
| 2023/0081171 A1* | 3/2023 | Zhang | G06T 11/00 |
| | | | 382/157 |
| 2023/0108422 A1 | 4/2023 | Brauer et al. | |
| 2023/0154161 A1 | 5/2023 | Pham et al. | |
| 2023/0177810 A1 | 6/2023 | Xu et al. | |
| 2023/0230198 A1 | 7/2023 | Zhang et al. | |
| 2024/0037822 A1* | 2/2024 | Aberman | G06N 3/0455 |
| 2024/0135683 A1 | 4/2024 | Li | |
| 2024/0171788 A1 | 5/2024 | Kreis et al. | |
| 2024/0193726 A1 | 6/2024 | Misra et al. | |
| 2024/0221235 A1 | 7/2024 | Gafni et al. | |
| 2024/0264718 A1 | 8/2024 | Benedetto et al. | |
| 2024/0265204 A1* | 8/2024 | Meeks | G06F 40/279 |
| 2024/0282016 A1 | 8/2024 | Liu et al. | |
| 2025/0209712 A1 | 6/2025 | Svitov et al. | |

OTHER PUBLICATIONS

Li, et al., "Text to Realistic Image Generation with Attentional Concatenation Generative Adversarial Networks", Discrete Dynamics in Nature and Society, vol. 2020, Article 1D 6452536, 10 pages. (Year: 2020).*
CN-111062865-A (Machine Translation on Mar. 6, 2025) (Year: 2020).*
1 Brock, et al., "Large Scale GAN Training for High Fidelity Natural Image Synthesis", arXiv preprint arXiv:1809.11096v2 [cs.LG] Feb. 25, 2019, 35 pages.
2 De Brabandere, et al., "Dynamic Filter Networks", arXiv preprint arXiv:1605.09673v2 [cs.LG] Jun. 6, 2016, 14 pages.
3 Deng, et al., "Imagenet: A Large-Scale Hierarchical Image Database", In 2009 IEEE Conference on Computer Vision and Pattern Recognition, pp. 248-255, 2009, 8 pages.
4 Dhariwal, et al., "Diffusion Models beat GANs on Image Synthesis", arXiv preprint arXiv:2105.05233v4 [cs.LG] Jun. 1, 2021, 44 pages.
5 Goodfellow, et al., "Generative Adversarial Nets", arXiv preprint arXiv:1406.2661v1 [stat.ML] Jun. 10, 2014, 9 pages.
6 Ha, et al., "HyperNetworks", arXiv preprint arXiv:1609.09106v4 [cs.LG] Dec. 1, 2016, 29 pages.
7 Ho, et al., "Cascaded Diffusion Models for High Fidelity Image Generation", in Journal of Machine Learning Research 23, pp. 1-33, Jan. 2022, 33 pages.
8 Ho, et al., "Classifier-Free Diffusion Guidance", arXiv preprint arXiv:2207.12598v1 [cs.LG] Jul. 26, 2022, 14 pages.
9 Karras, et al., "A Style-Based Generator Architecture for Generative Adversarial Networks", arXiv preprint arXiv:1812.04948v3 [cs.NE] Mar. 29, 2019, 12 pages.
10 Karras, et al., "Analyzing and Improving the Image Quality of StyleGAN", arXiv preprint arXiv:1912.04958v2 [cs.CV] Mar. 23, 2020, 21 pages.
11 Kim, et al., "The Lipschitz Constant of Self-Attention", arXiv preprint arXiv:2006.04710v2 [stat.ML] Jun. 9, 2021, 26 pages.
12 Kumari, et al., "Ensembling Off-the-shelf Models for GAN Training", arXiv preprint arXiv:2112.09130v3 [cs.CV] May 4, 2022, 35 pages.
13 Lee, et al., "ViTGAN: Training GANs with Vision Transformers", In International Conference on Learning Representations (ICLR), Apr. 2022, 18 pages.
14 Liang, et al., "CPGAN: Content-Parsing Generative Adversarial Networks for Text-to-Image Synthesis", arXiv preprint arXiv:1912.08562v2 [cs.CV] Jul. 12, 2020, 18 pages.
15 Miyato, et al., "cGANs with Projection Discriminator", arXiv preprint arXiv:1802.05637v2 [cs.LG] Aug. 15, 2018, 21 pages.
16 Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.
17 van den Oord, et al., "Representation Learning with Contrastive Predictive Coding", arXiv preprint arXiv:1807.03748v2 [cs.LG] Jan. 22, 2019, 13 pages.
18 Park, et al., "Contrastive Learning for Unpaired Image-to-Image Translation", arXiv preprint arXiv:2007.15651v3 [cs.CV] Aug. 20, 2020, 29 pages.
19 Radford, et al., "Learning Transferable Visual Models from Natural Language Supervision", arXiv preprint arXiv:2103.00020v1 [cs.CV] Feb. 26, 2021, 48 pages.
20 Radford, et al., "Unsupervised Representation Learning with Deep Convolutional Generative Adversarial Networks", arXiv preprint arXiv:1511.06434v2 [cs.LG] Jan. 7, 2016, 16 pages.
21 Ramesh, et al., "Hierarchical Text-Conditional Image Generation with CLIP Latents", arXiv preprint arXiv:2204.06125v1 [cs.CV] Apr. 13, 2022, 27 pages.
22 Reed, et al., "Generative Adversarial Text to Image Synthesis", arXiv preprint arXiv:1605.05396v2 [cs.NE] Jun. 5, 2016, 10 pages.
23 Rombach, et al., "High-Resolution Image Synthesis with Latent Diffusion Models", arXiv preprint arXiv:2112.10752v2 [cs.CV] Apr. 13, 2022, 45 pages.
24 Saharia, et al., "Photorealistic Text-to-Image Diffusion Models with Deep Language Understanding", arXiv preprint arXiv:2205.11487v1 [cs.CV] May 23, 2022, 46 pages.
25 Sauer, et al., "StyleGAN-XL: Scaling StyleGAN to Large Diverse Datasets", arXiv preprint arXiv:2202.00273v2 [cs.LG] May 5, 2022, 19 pages.
26 Tanjim, et al., "DynamicRec: A Dynamic Convolutional Network for Next Item Recommendation", In Proceedings of the 29th ACM International Conference on Information and Knowledge Management (CIKM-2020), pp. 2237-2240, 2020, 4 pages.
27 Tao, et al., "DF-GAN: A Simple and Effective Baseline for Text-to-Image Synthesis", arXiv preprint arXiv:2008.05865v4 [cs.CV] Oct. 15, 2022, 11 pages.
28 Vaswani, et al., "Attention Is All You Need", arXiv preprint arXiv:1706.03762v5 [cs.CL] Dec. 6, 2017, 15 pages.
29 Wang, et al., "Understanding Contrastive Representation Learning through Alignment and Uniformity on the Hypersphere", arXiv preprint arXiv:2005.10242v10 [cs.LG] Aug. 15, 2022, 41 pages.
30 Wu, et al., "Pay Less Attention with Lightweight and Dynamic Convolutions", arXiv preprint arXiv:1901.10430v2 [cs.CL] Feb. 22, 2019, 14 pages.
31 Xu, et al., "AttnGAN: Fine-Grained Text to Image Generation with Attentional Generative Adversarial Networks", In IEEE Conference on Computer Vision and Pattern Recognition (CVPR), 2018, pp. 1316-1324, 9 pages.
32 Yu, et al., "Scaling Autoregressive Models for Content-Rich Text-to-Image Generation", arXiv preprint arXiv:2206.10789v1 [cs.CV] Jun. 22, 2022, 49 pages.
33 Zhang, et al., "Cross-Modal Contrastive Learning for Text-to-Image Generation", arXiv preprint arXiv:2101.04702v5 [cs.CV] Apr. 14, 2022, 19 pages.
34 Zhang, et al., "StackGAN: Text to Photo-realistic Image Synthesis with Stacked Generative Adversarial Networks", arXiv preprint arXiv:1612.03242v2 [cs.CV] Aug. 5, 2017, 14 pages.
35 Zhang, et al., "The Unreasonable Effectiveness of Deep Features as a Perceptual Metric", arXiv preprint arXiv:1801.03924v2 [cs.CV] Apr. 10, 2018, 14 pages.
36 Zhao, et al., "Large Scale Image Completion via Co-Modulated Generative Adversarial Networks", arXiv preprint arXiv:2103.10428v1 [cs.CV] Mar. 18, 2021, 25 pages.
37 Zhu, et al., "DM-GAN: Dynamic Memory Generative Adversarial Networks for Text-to-Image Synthesis", arXiv preprint arXiv:1904.01310v1 [cs.CV] Apr. 2, 2019, 9 pages.
Combined Search and Examination Report dated Jun. 18, 2024 in corresponding United Kingdom Patent Application No. 2319189.3 (7 pages).
Li, et al., "Text to Realistic Image Generation with Attentional Concatenation Generative Adversarial Networks", Discrete Dynamics in Nature and Society, vol. 2020, Article ID 6452536, 10 pages.
Office Action dated May 20, 2025 in related U.S. Appl. No. 18/171,046.
Office Action dated Aug. 13, 2025 in relation U.S. Appl. No. 18/426,763.

(56) References Cited

OTHER PUBLICATIONS

Lüddecke, et al., "Image segmentation using text and image prompts", Proceedings of the IEEE/CVF conference on computer vision and pattern recognition, 2022, pp. 7086-7096, (Year: 2022).

Ma, et al., "AI illustrator: Translating raw descriptions into images by prompt-based cross-modal generation", Proceedings of the 30th ACM International Conference on Multimedia, 2022, pp. 4282-4290, (Year: 2022).

Zbinden, Robin; "Implementing and Experimenting with Diffusion Models for Text-to-Image Generation"; Sep. 2022; EPFL; p. 21-22; https://arxiv.org/pdf/2209.10948. (Year: 2022).

Zhu, Peihao; "Improved StyleGAN Embedding: Where are the Good Latents?"; Oct. 2021; p. 1-2; https://arxiv.org/pdf/2012.09036. (Year: 2021).

Wang, et al., "Deep Multi-Task Learning for Diabetic Retinopathy Grading in Fundus Images", May 2021; Proceedings of the AAAI Conference on Artificial Intelligence; 35(4); p. 2826-2834; https://doi.org/10.1609/aaai.v35i4.16388. (Year: 2021).

Li, et al.; "MILi: Multi-person inference from a low-resolution image"; Mar. 2023; Fundamental Research; vol. 3, Issue 3; p. 434-441; https://doi.org/10.1016/j.fmre.2023.02.006. (Year: 2023).

Office Action dated Aug. 22, 2025 in relation U.S. Appl. No. 18/585,957.

Office Action dated Sep. 16, 2025 in relation U.S. Appl. No. 18/439,036.

Office Action dated Oct. 1, 2025 in relation U.S. Appl. No. 18/171,046.

\* cited by examiner

TEXT-BASED IMAGE GENERATION

BACKGROUND

The following relates generally to machine learning, and more specifically to image generation using a machine learning model. Machine learning algorithms build a model based on sample data, known as training data, to make a prediction or a decision in response to an input without being explicitly programmed to do so. One area of application for machine learning is image generation. For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

SUMMARY

Aspects of the present disclosure provide systems and methods for text-based image generation. According to one aspect, a machine learning model of an image generation system generates style information based on input text, generates a style-adaptive convolution filter based on the style information, and generates an image based on the style-adaptive convolution filter.

The style information increases the realism of the image. By generating the style information based on the text input, the image generation system provides an increased amount of user control over the appearance of the image. By generating the style-adaptive convolution filter, the convolution capacity of the machine learning model is effectively scaled, thereby increasing the processing speed of the image generation system. By generating the image based on the style-adaptive convolution filter using a high-capacity machine learning model, the quality of the appearance of the image is increased.

A method, apparatus, non-transitory computer readable medium, and system for image generation are described. One or more aspects of the method, apparatus, non-transitory computer readable medium, and system include obtaining a text prompt; generating a style vector based on the text prompt; generating an adaptive convolution filter based on the style vector; and generating an image corresponding to the text prompt based on the adaptive convolution filter.

An apparatus and system for image generation are described. One or more aspects of the apparatus and system include at least one processor; at least one memory storing instructions executable by the at least one processor; a text encoder network comprising encoder parameters stored in the at least one memory, wherein the text encoder network is configured to encode a text prompt to obtain a global vector corresponding to the text prompt and a plurality of local vectors corresponding to individual tokens of the text prompt; a mapping network comprising mapping parameters stored in the at least one memory, wherein the mapping network is configured to generate a style vector based on the global vector; and an image generation network comprising image generation parameters stored in the at least one memory, wherein the image generation network is configured to generate an image corresponding to the text prompt based on the style vector and the plurality of local vectors.

A method, apparatus, non-transitory computer readable medium, and system for image generation are described. One or more aspects of the method, apparatus, non-transitory computer readable medium, and system include obtaining a training dataset including a training image and text describing the training image; generating a predicted style vector based on the text using a mapping network; generating a predicted image based on the predicted style vector using an image generation network; generating an image embedding based on the predicted image and a conditioning embedding based on the text using a discriminator network; and training the image generation network based on the image embedding and the conditioning embedding.

DETAILED DESCRIPTION

Figure 1:
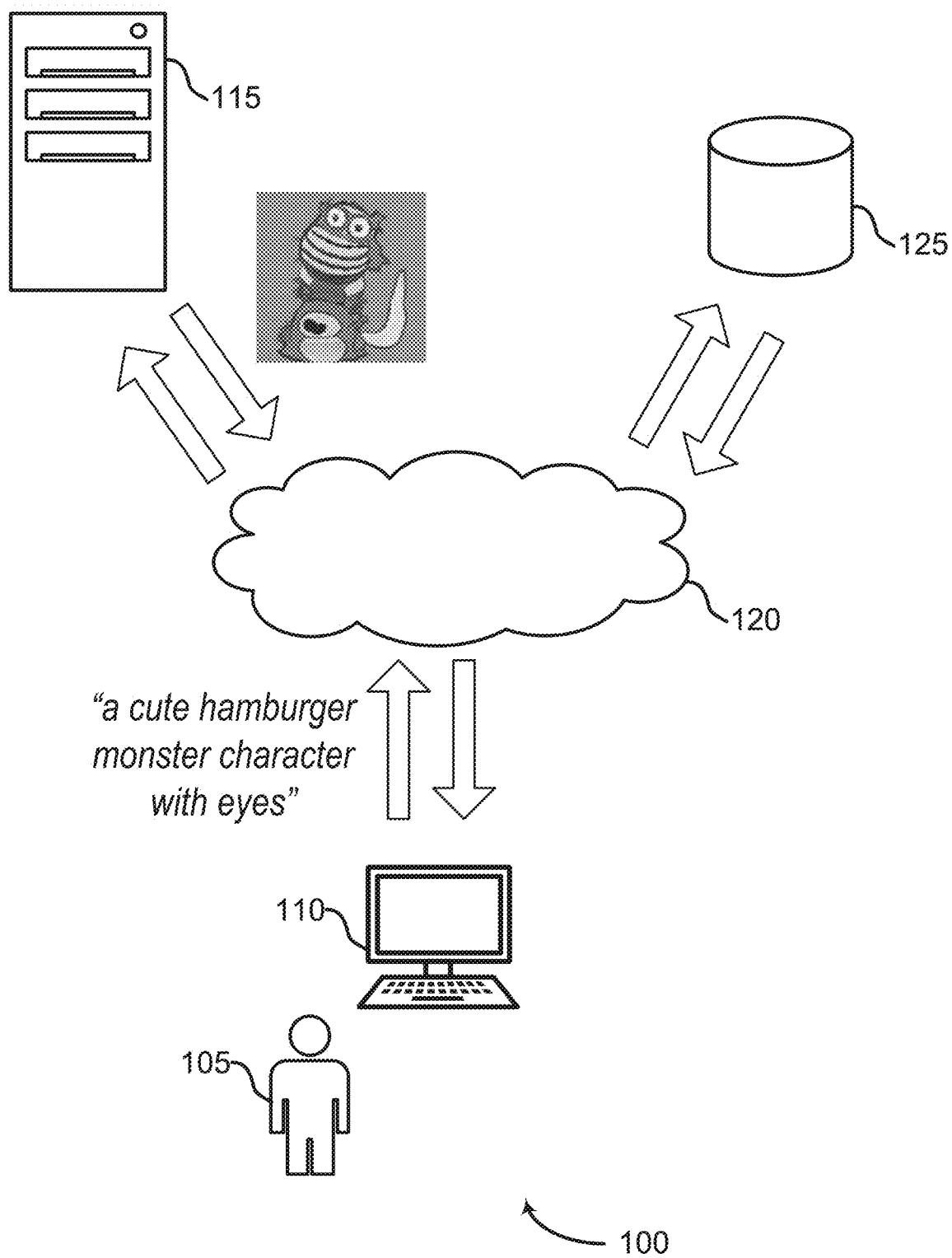
FIG. 1 shows an example of an image generation system according to aspects of the present disclosure.

Embodiments of the present disclosure relate generally to machine learning, and more specifically to image generation using a machine learning model. Machine learning algorithms build a model based on sample data, known as training data, to make a prediction or a decision in response to an input without being explicitly programmed to do so.

One area of application for machine learning is image generation. For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

One example of a current machine learning model that can generate an image based on a text input is a generative adversarial network (GAN), which is trained to produce a final output by iteratively refining an output of a synthesis network until a discriminator network is convinced that the output is "real", and diffusion models. GANs are inherently efficient because they can process an image through a single forward pass. However, the ability of GAN-based machine learning models to produce a high-quality image output is hindered due to a relatively small convolutional capacity at a computationally practical scale, which limits the GAN-based machine learning model to training on relatively small or category-specific datasets.

Another example of an image-generating machine learning model is a diffusion model, which generates an output by removing noise from an input. Diffusion models can produce higher-quality output images than GANs, but at the cost of a reduced processing speed.

Aspects of the present disclosure provide systems and methods for text-based image generation. According to one aspect, a machine learning model of an image generation system generates style information based on input text, generates an adaptive convolution filter based on the style information and a bank of convolution filters, and generates an image based on the adaptive convolution filter.

In some cases, the style information increases the realism of the image. By generating the style information based on the text input, the image generation system provides an increased amount of user control over the appearance of the image. By generating the adaptive convolution filter, the convolution capacity of the machine learning model is effectively scaled, thereby increasing the processing speed of the image generation system. By generating the image based on the adaptive convolution filter using a high-capacity machine learning model, the quality of the appearance of the image is increased.

In some cases, the machine learning model includes an attention layer configured to process the text input, where the image is generated based on the processed text input. By pairing the attention layer with a convolution layer, and generating the image accordingly, the capacity of the machine learning model is further increased, thereby further increasing the processing speed of the image generation system. In some cases, the style information is generated based on a global vector that relates to the text input as a whole.

Furthermore, according to some aspects, the increased capacity of the machine learning model helps the machine learning model to avoid training collapse when it is trained on a large-scale dataset. In some cases, the machine learning model is trained based on the style vector and a conditioning associated with the text input. In some cases, the machine learning model is trained using a loss that forces the machine learning model to use the conditioning.

An embodiment of the present disclosure is used in an image generation context. For example, a user provides a text input to the image generation system. The image generation system uses the machine learning model to compute style information based on the text input and generates an adaptive convolution filter for the style information. The image generation system then uses the machine learning model and the adaptive convolution filter to generate an image based on the style information and content described in the text input.

In some cases, the image generation system generates a variant of the image by injecting random noise into the image generation process, or altering a diversity parameter associated with the style information.

Further example applications of the present disclosure in the image generation context are provided with reference to FIGS. 1-4. Details regarding the architecture of the image generation system are provided with reference to FIGS. 1-7 and 15. Examples of a process for image generation are provided with reference to FIGS. 8-12. Examples of a process for training the machine learning model are provided with reference to FIGS. 13-14.

Accordingly, aspects of the present disclosure provide an image generation system that generates a high-quality image at a faster processing speed in response to a text prompt than conventional image generation systems are capable of. For example, by generating an adaptive convolution filter, a convolutional capacity of the image generation system is increased in a computationally feasible manner. In contrast, naïvely increasing a width of convolution layers of a conventional image generation system to attempt to increase the convolutional capacity of the convention image generation system would be computationally impractical at scale, as a same operation would need to be repeated across all locations.

Furthermore, in some cases, an attention layer is used to capture a long-range dependency between the image and the text prompt, further increasing the convolutional capacity of the image generation system compared to conventional image generation systems. Finally, in some cases, the increased convolutional capacity of the image generation system allows the image generation system to successfully generate realistic, text-conditioned images on large, open-ended datasets at a high processing speed using a controllable, linear latent vector space related to the style information that is highly amenable for well-studied image editing applications.

Image Generation System

A system and an apparatus for image generation is described with reference to FIGS. 1-7 and 15. One or more aspects of the system and the apparatus include at least one processor; at least one memory storing instructions executable by the at least one processor; a text encoder network comprising encoder parameters stored in the at least one memory, wherein the text encoder network is configured to encode a text prompt to obtain a global vector corresponding to the text prompt and a plurality of local vectors corresponding to individual tokens of the text prompt; a mapping network comprising mapping parameters stored in the at least one memory, wherein the mapping network is configured to generate a style vector based on the global vector; and an image generation network comprising image generation parameters stored in the at least one memory, wherein the image generation network is configured to generate an image corresponding to the text prompt based on the style vector and the plurality of local vectors.

In some aspects, the text encoder network comprises a pretrained encoder and a learned encoder that is trained together with the image generation network. In some aspects, the image generation network comprises a generative adversarial network (GAN).

In some aspects, the image generation network includes a convolution layer, a self-attention layer, and a cross-attention layer. In some aspects, the image generation network includes an adaptive convolution component configured to generate an adaptive convolution filter based on the style vector, wherein the image is generated based on the adaptive convolution filter.

Some examples of the system and the apparatus further include a discriminator network configured to generate an image embedding and a conditioning embedding, wherein the discriminator network is trained together with the image generation network using an adversarial training loss based on the image embedding and the conditioning embedding.

FIG. 1 shows an example of an image generation system 100 according to aspects of the present disclosure. The example shown includes user 105, user device 110, image generation apparatus 115, cloud 120, and database 125.

In the example of FIG. 1, user 105 provides a text prompt (e.g., "a cute hamburger monster character with eyes") to image generation apparatus 115 via user device 110. Image generation apparatus 115 determines a style vector based on the text input. In some cases, image generation apparatus 115 determines the style vector based on a latent code.

In some cases, a "latent code" refers to a sequence of symbols sampled from a distribution in a latent space. As used herein, a "style vector" refers to a vector in an intermediate latent space that is relatively disentangled compared to the latent space. A goal of disentanglement can be to create a latent space that comprises linear subspaces, each of which controls one factor of variation in an output, such as an image; the separation of factors increases the quality of the output. However, a sampling probability of each combination of factors in the latent space matches a corresponding density in training data, which precludes the factors from being fully disentangled with typical datasets and input latent distributions, which reduces a quality of the output.

The intermediate latent space is used because it does not have to support sampling according to any fixed distribution; rather, the sampling density of the intermediate latent space can be induced by a learned piecewise continuous mapping from the latent space. This mapping can be adapted to "unwarp" the intermediate latent space so that the factors of variation become more linear, allowing a more realistic image to be generated based on the disentangled representation provided by the style vector in the intermediate latent space than if the image were generated based directly on the entangled representation provided by the latent code. For example, the relative disentanglement provided by the style vector allows a "style" (e.g., a high-level attribute, such as a pose or an identity of a person) of the image to be effectively controlled and manipulated.

In the example of FIG. 1, image generation apparatus 115 generates an adaptive convolution filter based on the style vector. As used herein, a "convolution filter" (or convolution kernel, or kernel) refers to a convolution matrix or mask that does a convolution between the convolution and an image to blur, sharpen, emboss, detect edges, or otherwise manipulate pixels of the image. In some cases, when each pixel in an output image is a function of nearby pixels in an input image, the convolution filter is that function. As used herein, "adaptive" refers to the generated convolution filter's correspondence to a style associated with the style vector.

In some cases, image generation apparatus 115 generates the image based on the style vector using the adaptive convolution filter. In some cases, image generation apparatus 115 provides the image to user 105 via user device 110. Examples of images generated by image generation apparatus 115 are described with reference to FIGS. 3 and 4.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as the text prompt, the image, a diversity parameter described with reference to FIGS. 8 and 11-12, etc.) to be communicated between user 105 and image generation apparatus 115. An example of the user interface is described with reference to FIG. 3.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image generation apparatus 115 includes a computer implemented network. In some embodiments, the computer implemented network includes a machine learning model (such as the machine learning model described with reference to FIGS. 5 and 7). In some embodiments, image generation apparatus 115 also includes one or more processors, a memory subsystem, a communication interface, an I/O interface, one or more user interface components, and a bus as described with reference to FIG. 15. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Image generation apparatus 115 is an example of, or includes aspects of, the corresponding element described with reference to FIG. 5. Further detail regarding the architecture of image generation apparatus 115 is provided with reference to FIGS. 2-7 and 15. Further detail regarding a process for image generation is provided with reference to FIGS. 8-12. Further detail regarding a process for training the machine learning model is provided with reference to FIGS. 13 and 14.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

Figure 2:
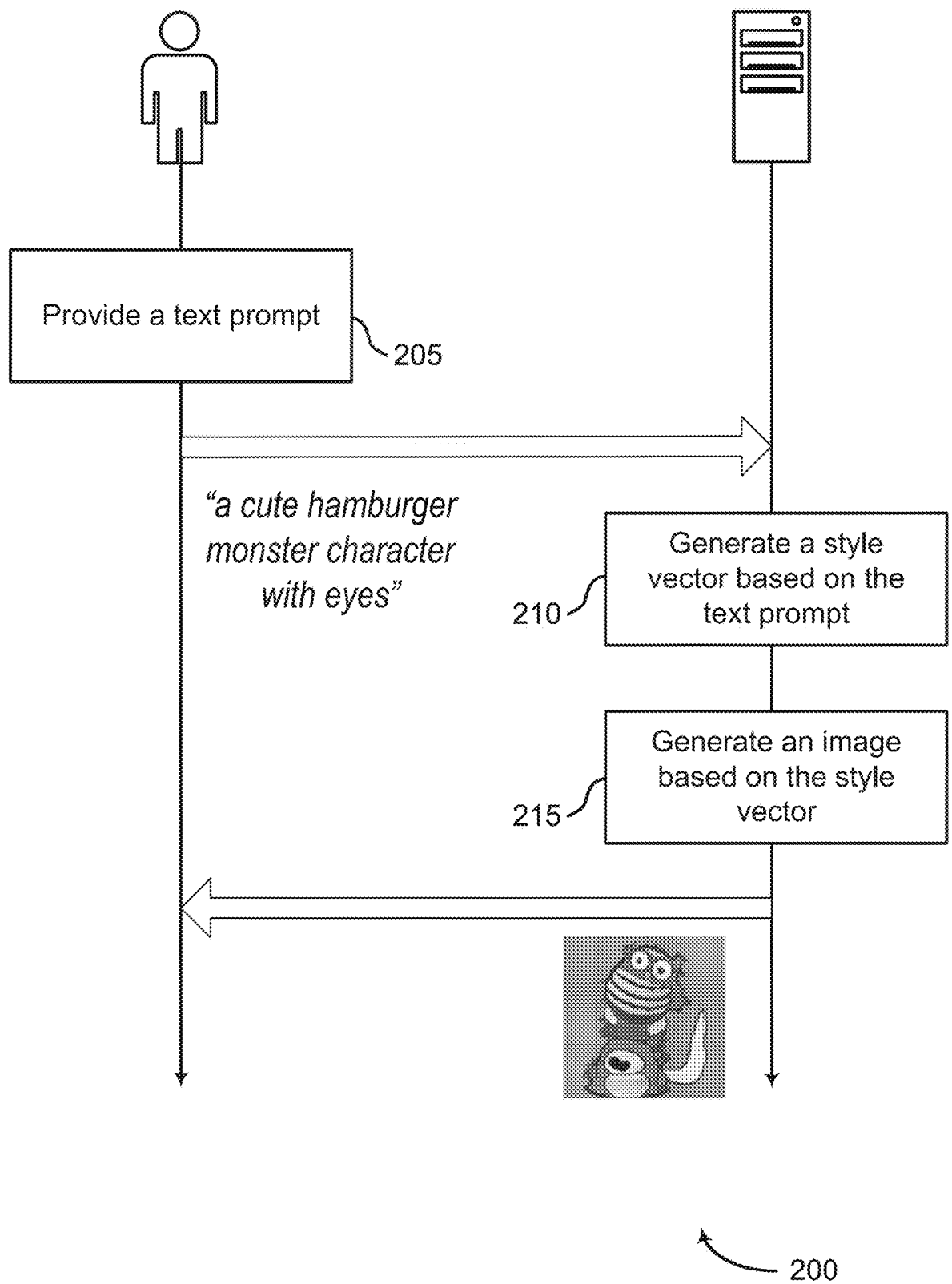
FIG. 2 shows an example of a method for image generation according to aspects of the present disclosure.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user (such as the user described with reference to FIG. 1) uses an image generation system (such as the image generation system described with reference to FIG. 1) to generate an image based on a text prompt. In some cases, the image generation system generates the image based on a style vector corresponding to the text prompt, thereby increasing a quality of the image and allowing low-level image characteristics (such as minor details) to be disentangled from high-level image characteristics (such as object orientation and object identity), which increases an ability to generate a set of images that share high-level characteristics and vary in low-level characteristics. For example, a set of images that depict a set of people can be generated, where high-level characteristics such as pose, hair color, face shape, eyeglasses, etc. are shared among each of the images in the set, but low-level variances such as eye color, hair style, freckles, etc. are varied among the images in the set.

At operation 205, the user provides a text prompt. In some cases, the user provides the text prompt via a user interface displayed on a user device (such as the user interface and user device described with reference to FIG. 1). In the example shown by FIG. 2, the text prompt is a natural language text prompt "a cute hamburger monster character with eyes".

At operation 210, the system generates a style vector based on the text prompt. In some cases, the operations of this step refer to, or may be performed by, an image generation system as described with reference to FIG. 1. For example, in some cases, the image generation system generates the style vector using a machine learning model as described with reference to FIG. 8. In some cases, the style vector is generated based on a global embedding of the text prompt.

At operation 215, the system generates an image based on the style vector. In some cases, the operations of this step refer to, or may be performed by, an image generation system as described with reference to FIG. 1. For example, in some cases, the image generation system generates the image based on the text prompt using the machine learning model as described with reference to FIG. 8. In some cases, the image generation system generates an adaptive convolution filter based on the style vector, where the image is generated based on the adaptive convolution filter. The system thereby effectively increases a convolution capacity of the machine learning model, which reduces processing time and allows for the machine learning model to be trained on a large data set.

As shown in FIG. 2, the image includes a depiction of the content described by the text prompt. In some cases, the image generation system displays the image to the user via the user interface.

Figure 3:
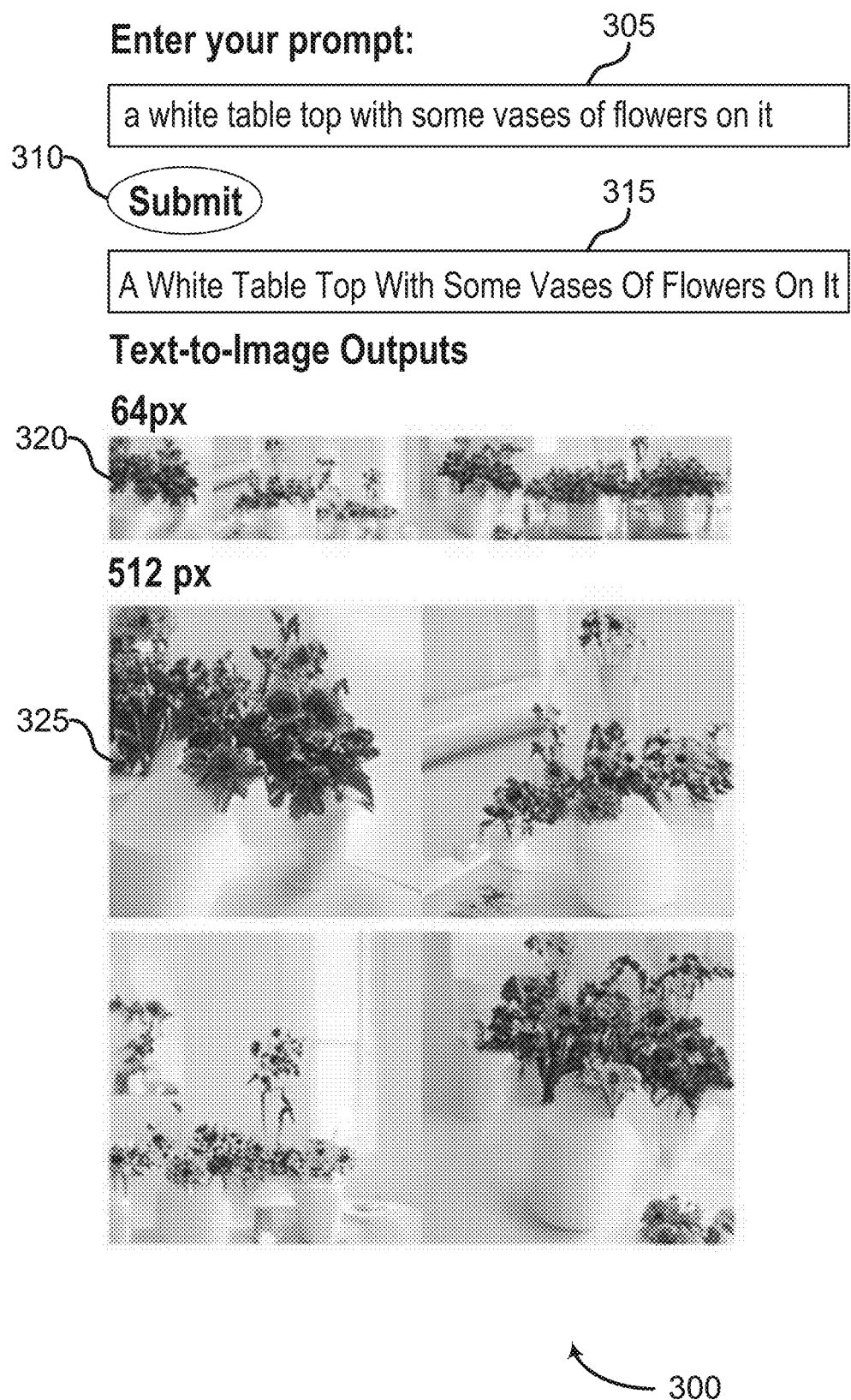
FIG. 3 shows an example of a user interface according to aspects of the present disclosure.

FIG. 3 shows an example of a user interface 300 according to aspects of the present disclosure. The example shown includes user interface 300, input box 305, submit button 310, confirmation box 315, first image display 320, and second image display 325. User interface 300 is a an example of, or includes aspects of, the corresponding element described with reference to FIG. 1.

Referring to FIG. 3, user interface 300 is displayed on a user device (such as the user device described with reference to FIG. 1) via an image generation apparatus (such as the image generation apparatus described with reference to FIGS. 1 and 5). Input box 305 accepts a text input (e.g., the text prompt described with reference to FIGS. 1 and 2). As shown in FIG. 3, the text prompt is "a white tabletop with some vases of flowers on it". In response to receiving a user input to submit button 310, the image generation apparatus displays the text prompt in confirmation box 315, generates an image based on the text prompt, and displays the image to the user via user interface 300 (e.g., in first image display 320 and second image display 325). As shown in FIG. 3, the image generation apparatus generates two sets of images at two different resolutions in response to the text prompt, where the sets of images jointly depict similar looking vases of flowers on a white tabletop, but vary in angle of depiction, lighting, background detail, etc.

Figure 4:
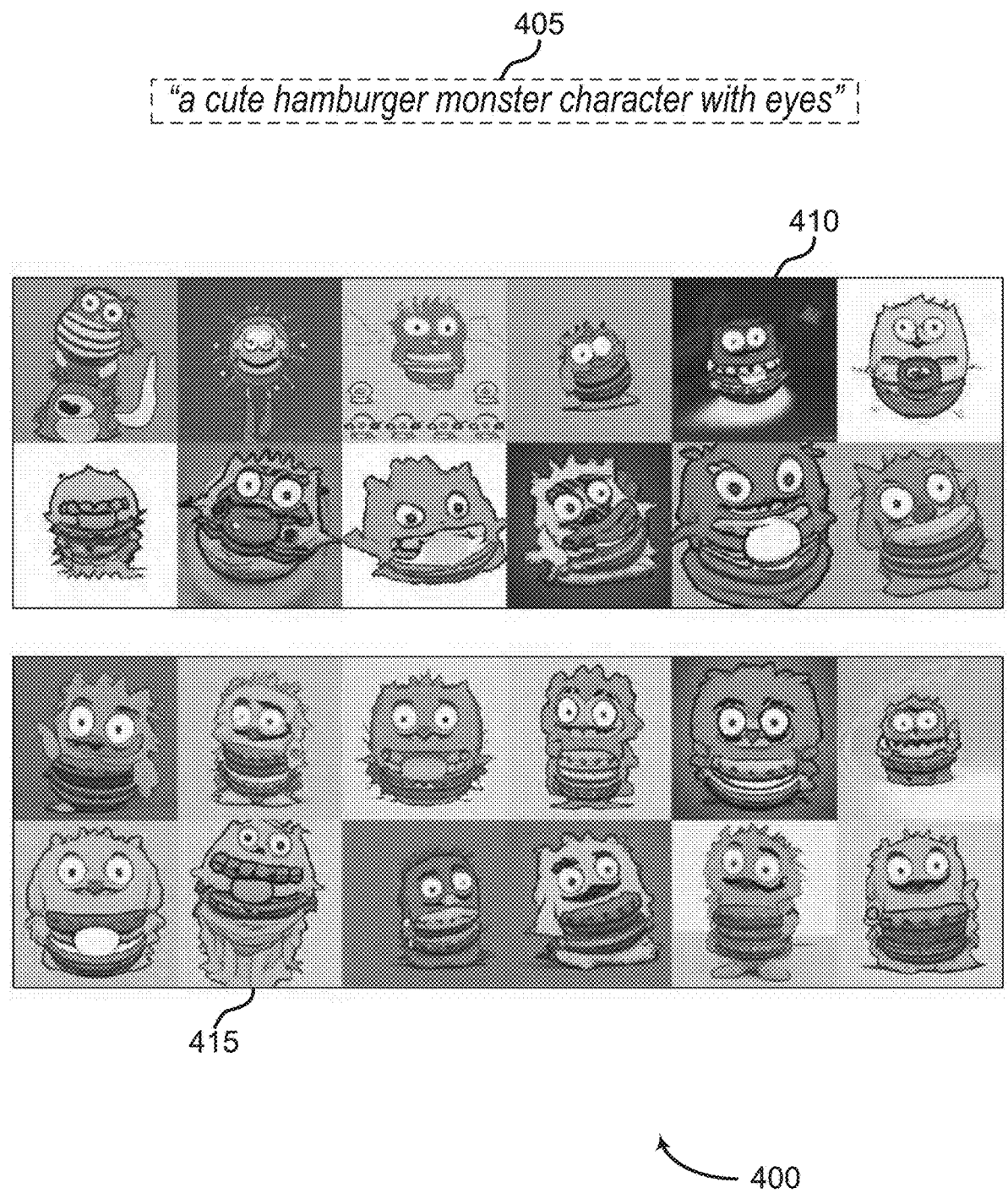
FIG. 4 shows an example of generated images according to aspects of the present disclosure.

FIG. 4 shows an example 400 of generated images according to aspects of the present disclosure. The example shown includes text prompt 405, first generated images 410, and second generated images 415.

Referring to FIG. 4, a user such as the user described with reference to FIG. 1 provides text prompt 405 ("a cute hamburger monster character with eyes") to an image generation system (such as the image generation system described with reference to FIG. 1). The image generation system generates first generated images 410 and second generated images 415 in response to text prompt 405. First generated images 410 depict high-quality variations on a cute hamburger monster character with eyes. Second generated images 415 also depict high-quality cute hamburger monster characters with eyes, but a diversity in visual appearance among the images is decreased due to the use of a "truncation trick" described with reference to FIGS. 8 and 11-12.

Figure 5:
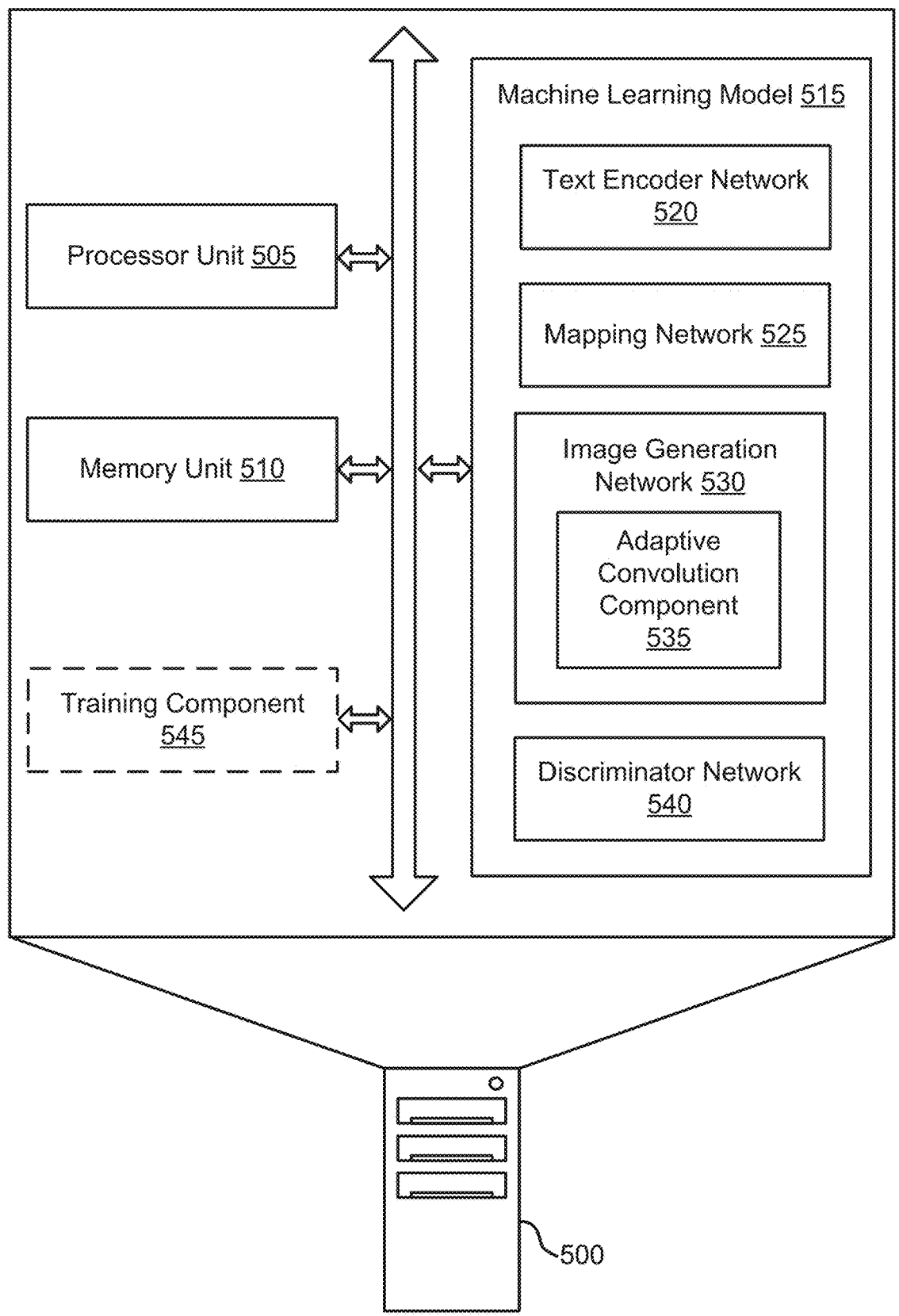
FIG. 5 shows an example of an image generation apparatus according to aspects of the present disclosure.

FIG. 5 shows an example of an image generation apparatus 500 according to aspects of the present disclosure. Image generation apparatus 500 is an example of, or includes aspects of, the corresponding element described with reference to FIG. 1. In one aspect, image generation apparatus 500 includes processor unit 505, memory unit 510, machine learning model 515, and training component 545. In one aspect, machine learning model 515 includes text encoder network 520, mapping network 525, image generation network 530, and discriminator network 540.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 15.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 505 to perform various functions described herein. In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 15.

In some cases, memory unit 510 stores parameters of machine learning model 515. In some cases, memory unit 510 stores encoder parameters of text encoder network 520. In some cases, memory unit 510 stores mapping parameters of mapping network 525. In some cases, memory unit 510 stores image generation parameters of image generation network 530.

According to some aspects, machine learning model 515 comprises one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Machine learning model 515 is an example of, or includes aspects of, the corresponding element described with reference to FIG. 7. According to some aspects, machine learning model 515 is implemented as software stored in memory unit 510 and executable by processor unit 505, as firmware, as one or more hardware circuits, or as a combination thereof. According to some aspects, machine learning model 515 comprises machine learning model parameters stored in memory unit 510.

According to some aspects, text encoder network 520 obtains a text prompt. In some examples, text encoder network 520 encodes the text prompt to obtain a text embedding. In some examples, text encoder network 520 transforms the text embedding to obtain a global vector corresponding to the text prompt as a whole and a set of local vectors corresponding to individual tokens of the text prompt, where the style vector is generated based on the global vector and the image is generated based on the set of local vectors.

According to some aspects, text encoder network 520 is configured to encode a text prompt to obtain a global vector corresponding to the text prompt and a plurality of local vectors corresponding to individual tokens of the text prompt. In some aspects, the text encoder network 520 includes a pretrained encoder and a learned encoder that is trained together with the image generation network 530.

According to some aspects, text encoder network 520 includes a pretrained encoder. and a learned encoder. In some cases, the pretrained encoder is implemented as a Contrastive Language-Image Pre-training (CLIP) model. In some cases, a CLIP model is an ANN that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets.

A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the CLIP model's text encoder. The model can then output a linear classifier of CLIP's visual representations.

According to some aspects, text encoder network 520 includes a learned encoder. In some cases, the learned encoder is trained together with image generation network 530. In some cases, the learned encoder comprises attention layers. In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. In some cases, the attention mechanism uses parameters called a query, a key, and a value.

Text encoder network 520 is an example of, or includes aspects of, the corresponding element described with reference to FIGS. 7 and 14. According to some aspects, text encoder network 520 is implemented as software stored in memory unit 510 and executable by processor unit 505, as firmware, as one or more hardware circuits, or as a combination thereof. According to some aspects, text encoder network 520 comprises encoder parameters stored in memory unit 510.

According to some aspects, mapping network 525 generates a style vector based on the text prompt. In some examples, mapping network 525 obtains a noise vector, where the style vector is based on the noise vector. In some examples, mapping network 525 identifies a diversity parameter. In some examples, mapping network 525 truncates the style vector based on the diversity parameter to obtain a truncated style vector, where the image is generated based on the truncated style vector.

According to some aspects, mapping network 525 generates a style vector based on the global vector. According to some aspects, mapping network 525 generates a predicted style vector based on the text using a mapping network 525.

According to some aspects, mapping network 525 comprises an ANN comprising a fully connected layer. In some cases, mapping network 525 comprises eight fully connected layers. In some cases, in a fully connected layer, a neuron of an ANN applies a linear transformation to an input vector through a weights matrix, where a non-linear transformation is then applied to the product through a non-linear activation function.

According to some aspects, mapping network 525 comprises a multi-layer perceptron (MLP). An MLP is a feedforward ANN that comprises one or more perceptron layers. A perceptron is an algorithm for supervised learning of binary classifiers. A binary classifier is a function that can decide whether or not an input, represented by a vector of numbers, belongs to some specific class. A binary classifier is a type of linear classifier, or a classification algorithm that makes a prediction based on a linear predictor function combining a set of weights with a feature vector.

Each perceptron layer may include an input layer, one or more hidden layers, and an output layer. Each node of the MLP may include a nonlinear activation function. An MLP may be trained using backpropagation (i.e., computing the gradient of the loss function with respect to the parameters).

Mapping network 525 is an example of, or includes aspects of, the corresponding element described with reference to FIG. 7. According to some aspects, mapping network 525 is implemented as software stored in memory unit 510 and executable by processor unit 505, as firmware, as one or more hardware circuits, or as a combination thereof. According to some aspects, mapping network 525 comprises mapping parameters stored in memory unit 510.

According to some aspects, image generation network 530 comprises a convolutional neural network (CNN). A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

According to some aspects, image generation network 530 generates an adaptive convolution filter based on the style vector. In some examples, image generation network 530 generates an image corresponding to the text prompt based on the adaptive convolution filter.

In some examples, image generation network 530 performs a cross-attention process based on the set of local vectors (for example, via a cross-attention layer), where the image is generated based on the cross-attention process. Cross-attention combines asymmetrically two separate embedding sequences of same dimension. One of the embedding sequences serves as a query input, while the other serves as a key input and a value input. In contrast, a self-attention input is a single embedding sequence.

In some examples, image generation network 530 initializes a feature map. As used herein, a "feature map" can refer to one or more feature vectors. As used herein, a "feature vector" can refer to an ordered numerical representation of features for a particular observation. In some cases, a feature map is a mapping of where a certain kind of feature is found in one or more pixels of an image. In some examples, image generation network 530 performs a convolution process on the feature map based on the adaptive convolution filter, where the image is generated based on the convolution process.

In some examples, image generation network 530 performs a self-attention process based on the feature map (for example, via a self-attention layer), where the image is generated based on the self-attention process. In some aspects, the self-attention process is based on an L2 distance (e.g., a Euclidean distance). In some examples, image generation network 530 identifies a set of predetermined convolution filters. In some examples, image generation network 530 combines the set of predetermined convolution filters based on the style vector to obtain the adaptive convolution filter.

According to some aspects, image generation network 530 comprises image generation parameters stored in the at least one memory, wherein the image generation network 530 is configured to generate an image corresponding to the text prompt based on the style vector and the plurality of local vectors. In some aspects, the image generation network 530 includes a convolution layer, a self-attention layer, and a cross-attention layer.

According to some aspects, image generation network 530 comprises adaptive convolution component 535. In some cases, adaptive convolution component 535 is configured to generate an adaptive convolution filter based on the style vector, where the image is generated based on the adaptive convolution filter.

In some aspects, the image generation network 530 includes a generative adversarial network (GAN). A GAN is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution). Therefore, given a training set, the GAN learns to generate new data with similar properties as the training set. A GAN may be trained via supervised learning, semi-supervised learning, unsupervised learning, and reinforcement learning.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Unsupervised learning is one of the three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

Reinforcement learning is one of the three basic machine learning paradigms, alongside supervised learning and unsupervised learning. Specifically, reinforcement learning relates to how software agents make decisions in order to maximize a reward. The decision making model may be referred to as a policy. Reinforcement learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

According to some aspects, image generation network 530 is implemented as a generator of a GAN included in machine learning model 515. According to some aspects, image generation network 530 generates a predicted image based on the predicted style vector using an image generation network 530. In some examples, image generation network 530 learns a feature map for an initial input to the image generation network 530.

Image generation network 530 is an example of, or includes aspects of, the corresponding element described with reference to FIGS. 7 and 14. According to some aspects, image generation network 530 is implemented as software stored in memory unit 510 and executable by processor unit 505, as firmware, as one or more hardware circuits, or as a combination thereof. According to some aspects, image generation network 530 comprises image generation parameters stored in the at least one memory.

According to some aspects, discriminator network 540 is configured to generate an image embedding and a conditioning embedding, wherein the discriminator network 540 is trained together with the image generation network 530 using an adversarial training loss based on the image embedding and the conditioning embedding.

According to some aspects, discriminator network 540 generates an image embedding based on the predicted image and a conditioning embedding based on the text. In some examples, discriminator network 540 generates a mixed conditioning embedding based on an unrelated text.

According to some aspects, discriminator network 540 is implemented as a classification ANN. According to some aspects, discriminator network 540 comprises a GAN. According to some aspects, discriminator network 540 is implemented as a discriminator of a GAN included in machine learning model 515, with one or more additional self-attention layers. In some cases, discriminator network 540 comprises a convolution branch configured to generate an image embedding based on an image. In some cases, discriminator network 540 comprises a conditioning branch configured to generate an conditioning embedding based on a conditioning vector.

In some cases, discriminator network 540 is an example of, or includes aspects of, the discriminator described with reference to FIG. 14. According to some aspects, discriminator network 540 is implemented as software stored in memory unit 510 and executable by processor unit 505, as firmware, as one or more hardware circuits, or as a combination thereof. According to some aspects, discriminator network 540 comprises discriminator parameters stored in the at least one memory.

According to some aspects, training component 545 obtains a training dataset including a training image and text describing the training image. In some examples, training component 545 trains the image generation network 530 based on the image embedding and the conditioning embedding. In some examples, training component 545 computes a generative adversarial network (GAN) loss based on the image embedding and the conditioning embedding, where the image generation network 530 is trained based on the GAN loss. In some examples, training component 545 computes a mixing loss based on the image embedding and the mixed conditioning embedding, where the image generation network 530 is trained based on the mixing loss.

Training component 545 is an example of, or includes aspects of, the corresponding element described with reference to FIG. 14. According to some aspects, training component 545 is implemented as software stored in memory unit 510 and executable by processor unit 505, as firmware, as one or more hardware circuits, or as a combination thereof.

In some cases, training component 545 is omitted from image generation apparatus 500 and is included in a separate apparatus to perform the functions described herein. In some cases, image generation apparatus 500 communicates with the separate apparatus to perform the training processes described herein. In some cases, training component 545 is implemented as software stored in memory of the separate apparatus and executable by a processor of the separate apparatus, as firmware, as one or more hardware circuits, or as a combination thereof.

Figure 6:
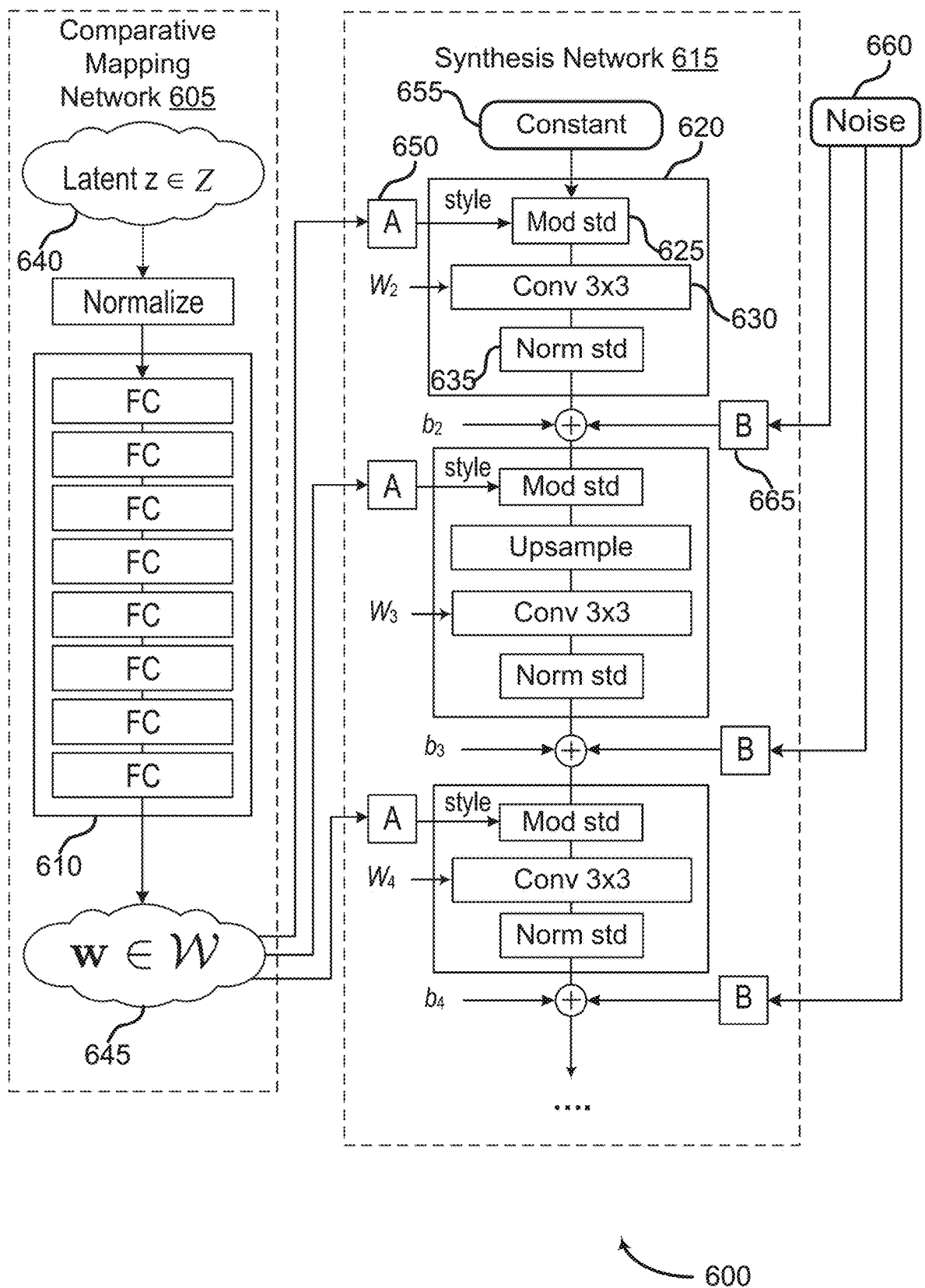
FIG. 6 shows an example of a comparative machine learning model.

FIG. 6 shows an example of a comparative machine learning model 600. The example shown includes comparative machine learning model 600, latent space 640, intermediate latent space 645, learned affine transformation 650, constant 655, noise 660, and learned per-channel scaling factor 665.

In one aspect, comparative machine learning model 600 includes comparative mapping network 605 and synthesis network 615. In one aspect, comparative mapping network 605 includes fully connected layers 610. In one aspect, synthesis network 615 includes style block 620. In one aspect, style block 620 includes modulation layer 625, convolution layer 630, and normalization layer 635.

Referring to FIG. 6, comparative machine learning model 600 is implemented as a style-based GAN (such as StyleGAN or a variation of StyleGAN) in which comparative mapping network 605 maps a sampled latent vector from latent space 640 to a style vector in intermediate latent space 645 via fully connected layers 610 and synthesis network 615 generates an image based on the style vector and a constant 655 (in some cases, a learned constant). Intermediate latent space 645 provides greater disentanglement than latent space 640, which allows automatic, unsupervised separation of high-level attributes (for example pose and identity) from stochastic variation (e.g., freckles, hair) in the generated image, and provides for intuitive scale-specific mixing and interpolation operations. Synthesis network 615 comprises a series of upsampling convolution layers modulated by the style vector. In comparative machine learning model 600, convolution is a main process used for generating all output pixels for the image, with the style vector as the only source of information to model conditioning.

In the implementation shown, synthesis network 615 comprises one or more style blocks, including style block 620, where a corresponding style is respectively active at each style block. Synthesis network 615 includes modulation layers (such as modulation layer 625), convolution layers (such as convolutional layer 630), and normalization layers (such as normalization layer 635).

In some cases, constant 655 (e.g., a 4×4×512 constant) is input to style block 620, and the output from style block 620 is combined with a bias b and noise 660 via learned per-channel scaling factor 665 to introduce variation and then passed to successive style blocks. At each style block, the style vector is received as a transformed input via learned affine transformation 650 to modulate constant 655. In some cases, the second style block includes an upsampling layer.

In some implementations of a style-based GAN, the style vector is transformed by learned affine transformation 650 and is incorporated into each block of synthesis network 615 following the convolutional layers via adaptive instance normalization (AdaIN) layers. In this case, synthesis network 615 applies bias and noise within the style block, rather than following the style block, causing the relative impact of the bias and noise to be inversely proportional to the current style's magnitudes.

In some cases, the AdaIN layers first standardize the output of constant 655 so that latent space 640 maps to features such that a randomly selected constant will result in features that are distributed with a Gaussian distribution, and then add the style vector as a bias term, thereby choosing a random latent variable such that the resulting output will not bunch up. In some cases, the output of each convolutional layer in synthesis network 615 is a block of activation maps. In some cases, the upsampling layer doubles the dimensions of input (e.g., from 4×4 to 8×8) and is followed by another convolutional layer or convolution layers.

Referring to FIG. 6, more predictable results can be obtained by moving bias and noise operations outside of the style blocks, where they can operate on normalized data. In some cases, synthesis network 615 enables normalization and modulation to operate on the standard deviation alone, as the mean is not needed. The application of bias, noise, and normalization to constant 655 can also be removed.

In some cases, an activation function (e.g., leaky ReLU) is applied right after adding the bias b. In some cases, the bias b is added outside an active area of a style, and only the standard deviation is adjusted per feature map. In some cases, an AdaIN operation is replaced with a "demodulation" operation, which is applied to the weights W associated with each convolution layer.

In some cases, in each style block, modulation is followed by a convolution and then normalization. The modulation scales each input feature map of the convolution based on the incoming style, which can alternatively be implemented by scaling the convolution weights W.

According to some embodiments, Gaussian noise is added to each activation map of synthesis network 615. In some cases, a different noise sample is generated for each style block and is interpreted using a learned per-channel scaling factor. In some embodiments, the Gaussian noise introduces style-level variation at a given level of detail.

Figure 7:
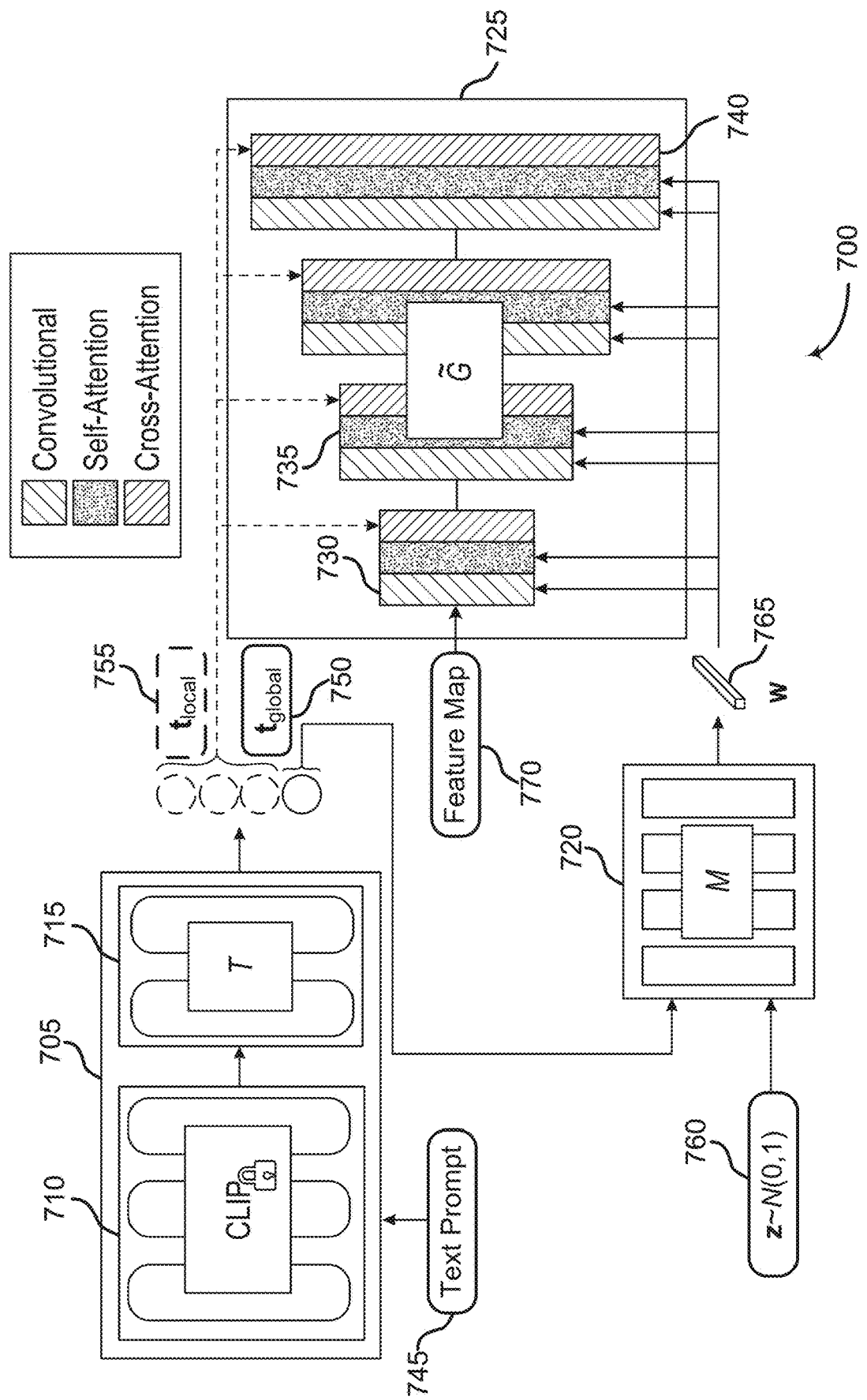
FIG. 7 shows an example of a machine learning model according to aspects of the present disclosure.

FIG. 7 shows an example of architecture of a machine learning model 700 according to aspects of the present disclosure. The example shown includes machine learning model 700, text prompt 745, global vector 750, local vectors 755, latent code 760, style vector 765, and feature map 770. In one aspect, machine learning model 700 includes text encoder network 705, mapping network 720, and image generation network 725. In one aspect, text encoder network 705 includes pretrained encoder 710 and learned encoder 715. In one aspect, image generation network 725 includes convolution block 730, self-attention block 735, and cross-attention block 740.

Referring to FIG. 7, pretrained encoder 710 (such as a CLIP encoder) of text encoder network 705 receives text prompt 745 and generates a conditioning vector in response as described with reference to FIG. 8. Pretrained encoder 710 provides the conditioning vector to learned encoder 715 as described with reference to FIG. 8. Learned encoder 715 generates a text embedding based on the conditioning vector and transforms the text embedding to obtain global vector 750 and local vectors 755 as described with reference to FIG. 8. Text encoder network 705 provides global embedding 750 to mapping network 720.

Mapping network 720 is an example of, or includes aspects of, the comparative mapping network described with reference to FIG. 6. For example, in some cases, mapping network 720 includes multiple fully connected layers. However, mapping network 720 generates a style vector based on a text input, whereas the comparative mapping network does not. For example, in some cases, mapping network samples latent code 760 from a normal distribution in a latent space (e.g., a latent code z~N(0,1)) and obtains style vector 765 in an intermediate latent space based on global vector 750 and latent code 760 as described with reference to FIG. 8.

In some cases, image generation network 725 is an example of, or includes aspects of, the synthesis network described with reference to FIG. 6. For example, in some cases, image generation network 725 maps a style vector and a feature map input (e.g., the constant described with reference to FIG. 6) using convolution blocks to obtain an image. For example, in some cases, each convolution block (e.g., convolution block 730) can be included in a style block as described with reference to FIG. 6. In some cases, image generation network 725 adds noise, bias, or a combination thereof between outputs to introduce variation as described with reference to FIG. 6. However, in some cases, image generation network 725 performs an adaptive convolution filter process to increase the convolution capacity of image generation network 725, allowing a higher-quality images to be generated. The adaptive convolution filter process is not performed by the synthesis network of FIG. 6.

Additionally, in some cases, image generation network 725 includes a self-attention block comprising one or more self-attention layers (such as self-attention block 735), a cross-attention block comprising one or more cross-attention layers (such as cross-attention block 740), or a combination thereof to further increase the capacity of image generation network 725. The cross-attention block and the self-attention block are not included in the synthesis network of FIG. 6.

In some cases, a self-attention block and a cross-attention block is respectively added to each style block as described with reference to FIG. 6. Accordingly, in some cases, the increased convolution capacity of image generation network 725 allows image generation network 725 to generate a higher-quality image than the synthesis network of FIG. 6 is capable of producing, while retaining a high processing speed that is characteristic of the synthesis network of FIG. 6.

In some cases, the convolution blocks of image generation network 725 comprise a series of upsampling convolution layers, similar to the synthesis network of FIG. 6. In some cases, each convolution layer is enhanced with an adaptive convolution filter $g^\ell_{adaconv}$ described with reference to FIGS. 8 and 9 followed by a cross-attention layer $g^\ell_{cross-attention}$ and a self-attention layer $g^\ell_{attention}$:

$$f_{\ell+1} = g^\ell_{cross-attention}(g^\ell_{attention}(g^\ell_{adaconv}(f_{\ell+1}, w), w), t_{local}) \quad (1)$$

In some cases, f is a feature, w is a style vector, and $t_{local}$ is a local vector as described with reference to FIG. 8. In some cases, a depth of image generation network 725 is increased by adding more blocks at each layer of image generation network 725. In some cases, image generation network reduces a dimensionality of latent code 760 to 128 and does not use style mixing and path length regularizers, thereby increasing performance in multi-category generation.

Mapping network 720 provides style vector 765 to one or more convolution layers (e.g., a convolution layer included in convolution block 730) and to one or more self-attention layers (e.g., a self-attention layer included in self-attention block 735) of image generation network 725 for processing as described with reference to FIG. 8. Meanwhile, text encoder network 705 provides local vectors 755 to one or more cross-attention layers (e.g., a cross-attention layer included in cross-attention block 740) for processing as described with reference to FIG. 8.

Accordingly, in some cases, as described with reference to FIG. 8, image generation network 725 generates a text-conditioned image by modulating convolutions of feature map 770 using style vector 765, where the content described by the text prompt is passed to image generation network 725 via a combination of style vector 765 and local vectors 755, a long-range dependence between feature map 770 and style vector 765 is captured by the self-attention blocks, and a visual alignment between text prompt 745 and the image is increased by attending to local vectors 755 in the self-attention blocks.

Machine learning model 700 is an example of, or includes aspects of, the corresponding element described with reference to FIG. 5. In some cases, machine learning model 700 is an example of, or includes aspects of, the comparative machine learning model described with reference to FIG. 6.

Text encoder network 705 is an example of, or includes aspects of, the corresponding element described with reference to FIG. 5.

Mapping network 720 is an example of, or includes aspects of, the corresponding element described with reference to FIG. 5. In some cases, mapping network 720 is an example of, or includes aspects of, the comparative mapping network described with reference to FIG. 6.

Image generation network 725 is an example of, or includes aspects of, the corresponding element described with reference to FIGS. 5 and 14. In some cases, image generation network 725 is an example of, or includes aspects of, the synthesis network described with reference to FIG. 6. In some cases, some architectural details of the comparative machine learning model described with reference to FIG. 6 are matched, such as an equalized learning rate and weight initialization from a unit normal distribution.

Text prompt 745 is an example of, or includes aspects of, the corresponding element described with reference to FIGS. 1-4. Style vector 765 is an example of, or includes aspects of, the corresponding element described with reference to FIGS. 7 and 9.

Image Generation

A method for image generation is described with reference to FIGS. 8-12. One or more aspects of the method include obtaining a text prompt; generating a style vector based on the text prompt; generating an adaptive convolution filter based on the style vector; and generating an image corresponding to the text prompt based on the adaptive convolution filter.

Some examples of the method further include encoding the text prompt to obtain a text embedding. Some examples further include transforming the text embedding to obtain a global vector corresponding to the text prompt as a whole and a plurality of local vectors corresponding to individual tokens of the text prompt, wherein the style vector is generated based on the global vector and the image is generated based on the plurality of local vectors.

Some examples of the method further include performing a cross-attention process based on the plurality of local vectors, wherein the image is generated based on the cross-attention process. Some examples of the method further include obtaining a noise vector, wherein the style vector is based on the noise vector.

Some examples of the method further include initializing a feature map. Some examples further include performing a convolution process on the feature map based on the adaptive convolution filter, wherein the image is generated based on the convolution process.

Some examples of the method further include performing a self-attention process based on the feature map, wherein the image is generated based on the self-attention process. In some aspects, the self-attention process is based on an L2 distance.

Some examples of the method further include identifying a plurality of predetermined convolution filters. Some examples further include combining the plurality of predetermined convolution filters based on the style vector to obtain the adaptive convolution filter.

Some examples of the method further include identifying a diversity parameter. Some examples further include truncating the style vector based on the diversity parameter to obtain a truncated style vector, wherein the image is generated based on the truncated style vector.

Figure 8:
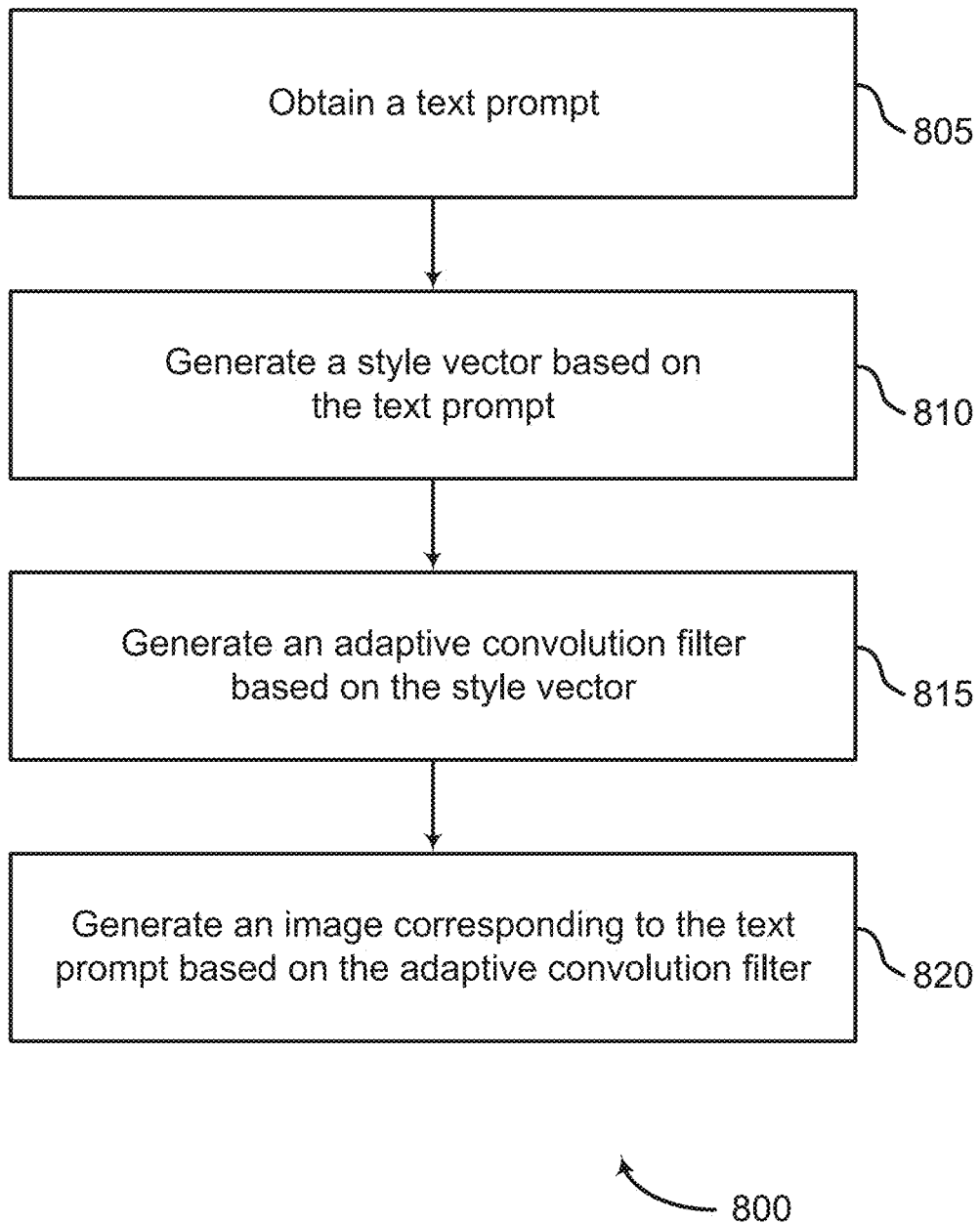
FIG. 8 shows an example of a method for generating an image according to aspects of the present disclosure.

FIG. 8 shows an example of a method 800 for generating an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, an image generation apparatus (such as the image generation apparatus described with reference to FIGS. 1 and 5) uses a machine learning model (such as the machine learning model described with reference to FIGS. 5 and 7) to generate an image based on a text prompt. By generating the image based on the text prompt, the image generation apparatus allows a layperson to quickly and easily generate a high-quality image without needing an original image as an initial input. Furthermore, by generating the image based on a text prompt, the image generation apparatus increases an automation possibility of an image generation process (for example, by generating images in response to automatically generated text input).

In some cases, the machine learning model generates a style vector based on the text prompt, and generates the image based on the text prompt. The style vector allows the machine learning model to control information corresponding to attributes of the image throughout a process of generating the image, resulting in a higher-quality image.

In some cases, the machine learning model generates an adaptive convolution filter from a bank of convolution filters based on the style vector. In some cases, the image generation apparatus generates the image based on the adaptive convolution filter. By generating the adaptive convolution filter based on the bank of convolution filters, the convolution capacity of the image generation network is increased, thereby increasing the speed of the image generation process and increasing the quality of the image, without being computationally impractical.

At operation 805, the system obtains a text prompt. In some cases, the operations of this step refer to, or may be performed by, a text encoder network as described with reference to FIGS. 5, 7, and 14. For example, in some cases, a user provides the text prompt to the text encoder network via a user interface of a user device as described with reference to FIG. 1. In some cases, the text encoder network retrieves the text prompt from a database (such as the database described with reference to FIG. 1). In some cases, the text encoder network retrieves the text prompt from the database in response to a user instruction.

At operation 810, the system generates a style vector based on the text prompt. In some cases, the operations of this step refer to, or may be performed by, a mapping network as described with reference to FIGS. 5 and 7. For example, in some cases, a style vector w is generated as described with reference to FIG. 10.

At operation 815, the system generates an adaptive convolution filter based on the style vector. In some cases, the operations of this step refer to, or may be performed by, an image generation network as described with reference to FIGS. 5, 7, and 14.

A machine learning model having an enhanced capacity of convolution filters is able to take advantage of a large and diverse training set to learn to output high-quality images. However, naïvely increasing a width of convolution layers becomes computationally impractical as a same operation needs to be repeated across all locations. Accordingly, in some cases, the expressivity of convolution filters of the image generation network is instead efficiently enhanced by creating a convolution filter on-the-fly based on a conditioning vector c (such as the conditioning vector $c \in \mathbb{R}^{C \times 1024}$ described with reference to FIG. 10) as described with reference to FIG. 9.

At operation 820, the system generates an image corresponding to the text prompt based on the adaptive convolution filter. In some cases, the operations of this step refer to, or may be performed by, an image generation network as described with reference to FIGS. 5, 7, and 14.

For example, in some cases, the image generation network initializes a feature map (such as the feature map described with reference to FIG. 7). In some cases, the feature map is a learned feature map. In some cases, the image generation network learns the feature map by being trained to learn the feature map. In some cases, the feature map respectively corresponds to features of pixels of the image. In some cases, the feature map is a constant. In some cases, the image generation network performs a convolution process on the feature map based on the adaptive convolution filter (such as the adaptive convolution filter K described with reference to FIG. 9), where the image is generated based on the convolution process. For example, in some cases, the image generation network is trained to process the feature map using the adaptive convolution filter to predict an image $z \in \mathbb{R}^{H \times W \times 3}$, where the convolution layer including the adaptive convolution filter is modulated by the style vector.

According to some aspects, the image generation network performs a self-attention process based on the feature map. For example, in some cases, the adaptive convolution layer is helped to contextualize itself in relationship to a distant part of the image by processing the feature map using a self-attention layer $g_{attention}$. In some cases, a self-attention layer $g_{attention}$ is interleaved with a convolutional block of the image generation network, leveraging the style vector as an additional token. Accordingly, in some cases, the self-attention layer $g_{attention}$ injects more expressivity into the parameterization of the machine leaning model by capturing long-range dependence.

In some cases, a naïve addition of attention layers to a machine learning model such as the comparative machine learning model described with reference to FIG. 6 may cause training to collapse, possibly because a dot-product self-attention process is not Lipschitz. Accordingly, in some cases, a self-attention layer of the image generation network uses an L2 distance (e.g., a Euclidean distance) as an attention logit to promote Lipschitz continuity. In some cases, a performance of the image generation network is increased by scaling down the L2 distance attention logit to roughly match a unit normal distribution at initialization. In some cases, a performance of the image generation network is increased by reducing a residual gain from the self-attention layer $g_{attention}$. In some cases, a performance of the image generation network is increased by tying a key and query matrix of the self-attention layer $g_{attention}$ and applying weight decay to the key and query matrix.

In some cases, the image is generated based on a truncated style vector as described with reference to FIGS. 11 and 12.

Figure 9:
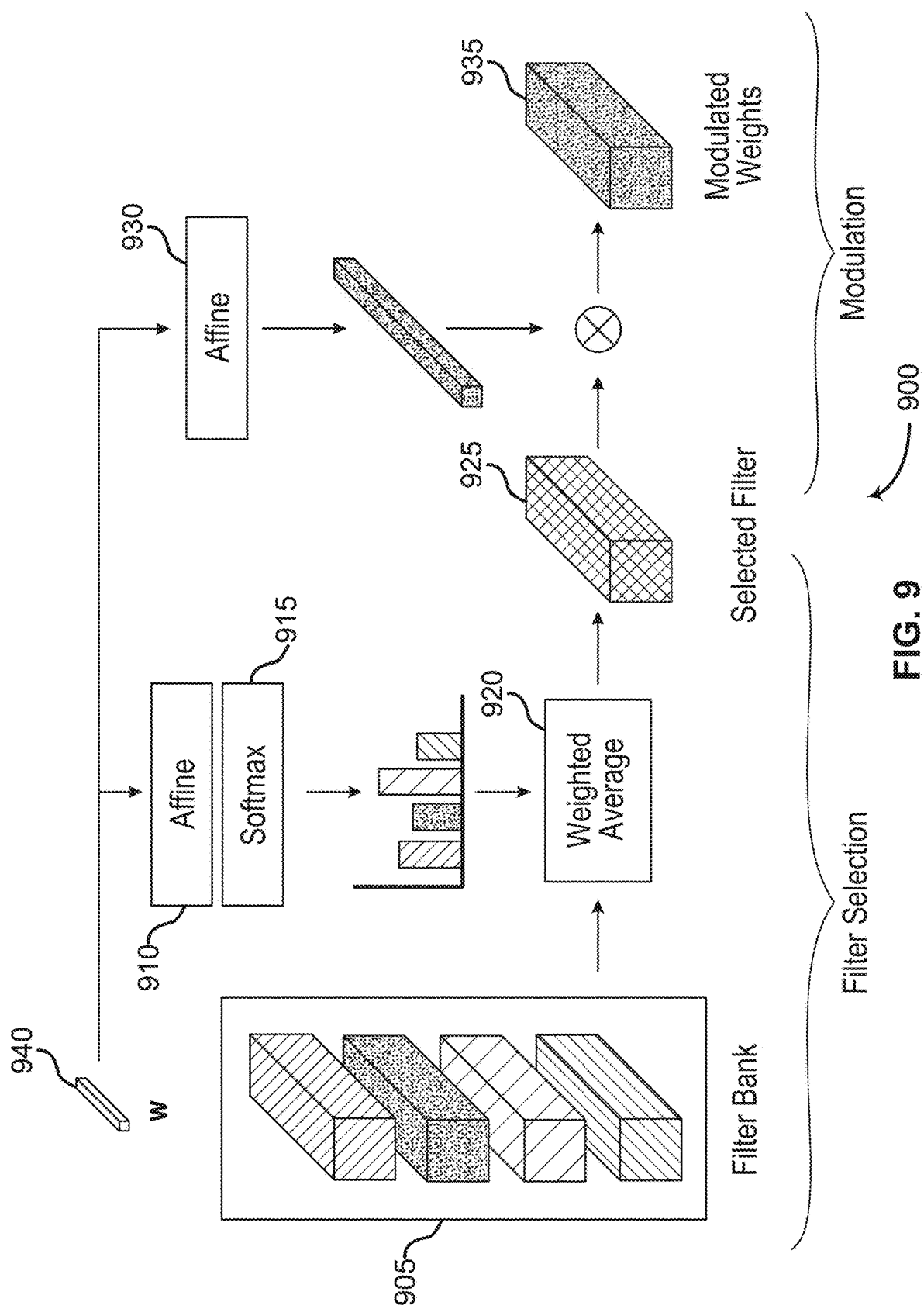
FIG. 9 shows an example of adaptive convolution filter generation according to aspects of the present disclosure.

FIG. 9 shows an example of adaptive convolution filter generation according to aspects of the present disclosure. The example shown includes convolution layer 900 and style vector 940. In one aspect, convolution layer 900 includes filter bank 905, first affine layer 910, softmax 915, weighted average 920, adaptive convolution filter 925, second affine layer 930, and modulated weights 935. Style vector 940 is an example of, or includes aspects of, the corresponding element described with reference to FIG. 7.

Referring to FIG. 9, according to some aspects, convolution layer 900 is included in a convolution block such as the convolution block described with reference to FIG. 7. In some cases, an adaptive filter component (such as the adaptive filter component described with reference to FIG. 5) instantiates filter bank 905, e.g., a set of N predetermined convolution filters $\{K_i \in \mathbb{R}^{C_{in} \times C_{out} \times K \times K}\}_{i=1}^{N}$, rather than one convolution filter. In some cases, filter bank 905 takes a feature $f \in \mathbb{R}^{C_{in}}$. In some cases, style vector 940 (e.g., a style vector $w \in \mathbb{R}^d$ generated based on the conditioning vector c as described with reference to FIG. 9) then goes through an affine layer $[W_{filt}, b_{filt}] \in \mathbb{R}^{(d+1) \times N}$ (e.g., first affine layer 910), where b is a bias and W is a weight, and softmax 915 to predict a set of weights W to average across the convolution filters (e.g., weighted average 920) to generate adaptive convolution filter 925, e.g., an aggregated or combined filter $K \in \mathbb{R}^{C_{in} \times C_{out} \times K \times K}$:

$$K = \sum_{i=1}^{N} K_i \cdot \text{softmax}(W_{filt}^T w + b_{filt})_i \quad (2)$$

In some cases, the softmax-based weighting can be viewed as a differentiable filter selection process based on input conditioning. Furthermore, in some cases, as the filter selection process is performed once at each layer, the selection process is much faster than the actual convolution process, thereby effectively decoupling computing complexity from image resolution. In some cases, then, a convolution filter is dynamically selected based on an input conditioning.

In some cases, adaptive convolution filter 925 is used in a convolution pipeline of the image generation network. For example, in some cases, image generation network implements a similar convolution pipeline as the synthesis network described with reference to FIG. 6. In some cases, a second affine layer $[W_{mod}^T, b_{mod}] \in \mathbb{R}^{(d+1) \times C_{in}}$ (e.g., second affine layer 930) is used for weight modulation or weight demodulation:

$$g_{adaconv}(f, w) = ((W_{mod}^T w + b_{mod}) \otimes K) * f \quad (3)$$

In some cases, $\otimes$ represents weight modulation or weight demodulation and * represents convolution.

Figure 10:
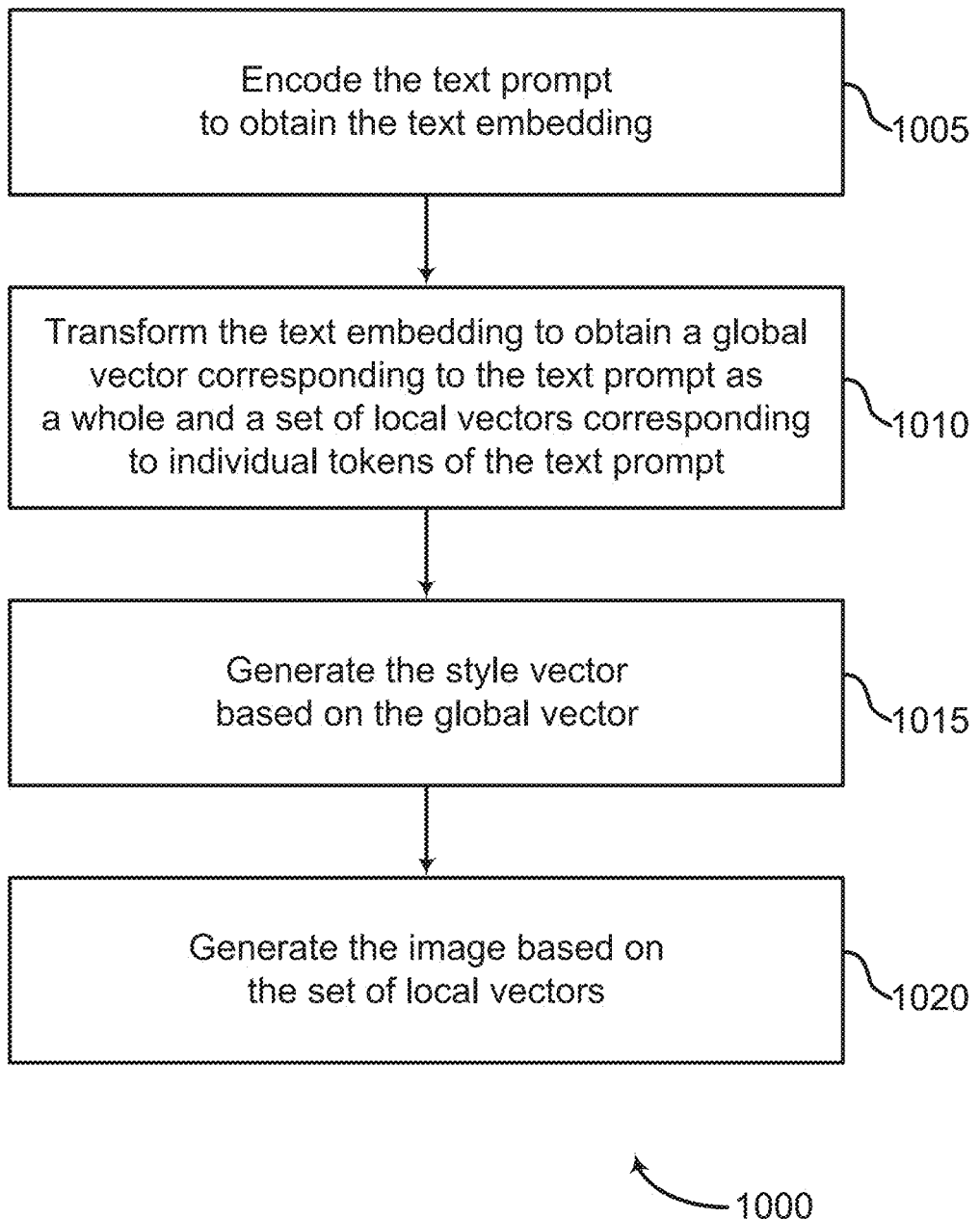
FIG. 10 shows an example of a method for image generation based on global and local vectors according to aspects of the present disclosure.

FIG. 10 shows an example of a method 1000 for image generation based on global and local vectors according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, an image generation apparatus such as the image generation apparatus described with reference to FIGS. 1 and 5 generates a style vector based on a text prompt.

At operation 1005, the system encodes the text prompt to obtain a text embedding. In some cases, the operations of this step refer to, or may be performed by, a text encoder network as described with reference to FIGS. 5, 7, and 14. For example, the text encoder network receives the text prompt as described with reference to FIG. 8.

In some cases, the text encoder network generates the text embedding via a pretrained encoder (such as the pretrained encoder described with reference to FIGS. 5 and 7). In some cases, the pretrained encoder is a CLIP model. In some cases, the pretrained encoder pads the text prompt to C words. In some cases, C=77. In some cases, the pretrained encoder tokenizes the text prompt to produce a conditioning vector $c \in \mathbb{R}^{C \times 1024}$. In some cases, the $\mathbb{R}^{C \times 1024}$ pretrained encoder embeds the tempt prompt to obtain word embeddings. In some cases, the text encoder network uses features from a penultimate layer of a frozen CLIP feature extractor in order to leverage the pretraining of the pretrained encoder. In some cases, the text encoder network uses a learned encoder (such as the learned encoder described with reference to FIGS. 5 and 7) to process the output of the pretrained encoder to obtain text embedding $t = T(\text{CLIP}(c)) \in \mathbb{R}^{C \times 1024}$. In some cases, the attention layers of the learned encoder allow for additional flexibility.

At operation 1010, the system transforms the text embedding to obtain a global vector corresponding to the text prompt as a whole and a set of local vectors corresponding to individual tokens of the text prompt. In some cases, the operations of this step refer to, or may be performed by, a text encoder network as described with reference to FIGS. 5, 7, and 14.

For example, according to some aspects, each component $t_i$ of the text embedding t is an embedding of an i-th word in the text prompt. In some cases, the learned encoder transforms each component $t_i$ to a corresponding local vector $t_{local} = t_{\{1:C\} \setminus EOF} \in \mathbb{R}^{(C-1) \times 1024}$ in a set of local vectors, where EOF refers to an end of field component of the text embedding t. In some cases, the end of field component of the text embedding t aggregates global information of the text prompt (e.g., the information as a whole), and the learned encoder therefore transforms the EOF component to a global vector $t_{global} \in \mathbb{R}^{1024}$ that corresponds to the text prompt as a whole.

At operation 1015, the system generates the style vector based on the global vector. In some cases, the operations of this step refer to, or may be performed by, a mapping network as described with reference to FIGS. 5 and 7. For example, in some cases, the mapping network M processes the global vector $t_{global} \in \mathbb{R}^{1024}$ and a latent code $z \sim N(0,1) \in \mathbb{R}^{128}$ (e.g., in some cases, a noise vector sampled from a normal distribution in a latent space $\mathcal{Z}$) to extract a style vector $w = M(z, t_{global})$ in an intermediate latent space $\mathcal{W}$.

At operation 1020, the system generates the image based on the set of local vectors. In some cases, the operations of this step refer to, or may be performed by, an image generation network as described with reference to FIGS. 5, 7, and 14. For example, in some cases, the image generation network performs a cross-attention process based on the set of local vectors. In some cases, the image generation network includes a set of attention blocks. In some cases, at each attention block, the cross-attention process $g_{cross-attention}$ attends to the set of local vectors representing individual word embeddings, thereby increasing an alignment between the text prompt and the image. In some cases, for cross-attention process $g_{cross-attention}$, an input feature tensor (e.g., a feature map such as the feature map described with reference to FIG. 7) is a query, the set of local vectors are a key and a value.

In some cases, the set of local vectors are used as features for cross-attention in the image generation network $\tilde{G}$ for generating an image $x \in \mathbb{R}^{H \times W \times 3}$ described with reference to FIG. 8:

$$x = \tilde{G}(w, t_{local}) \quad (4)$$

Figure 11:
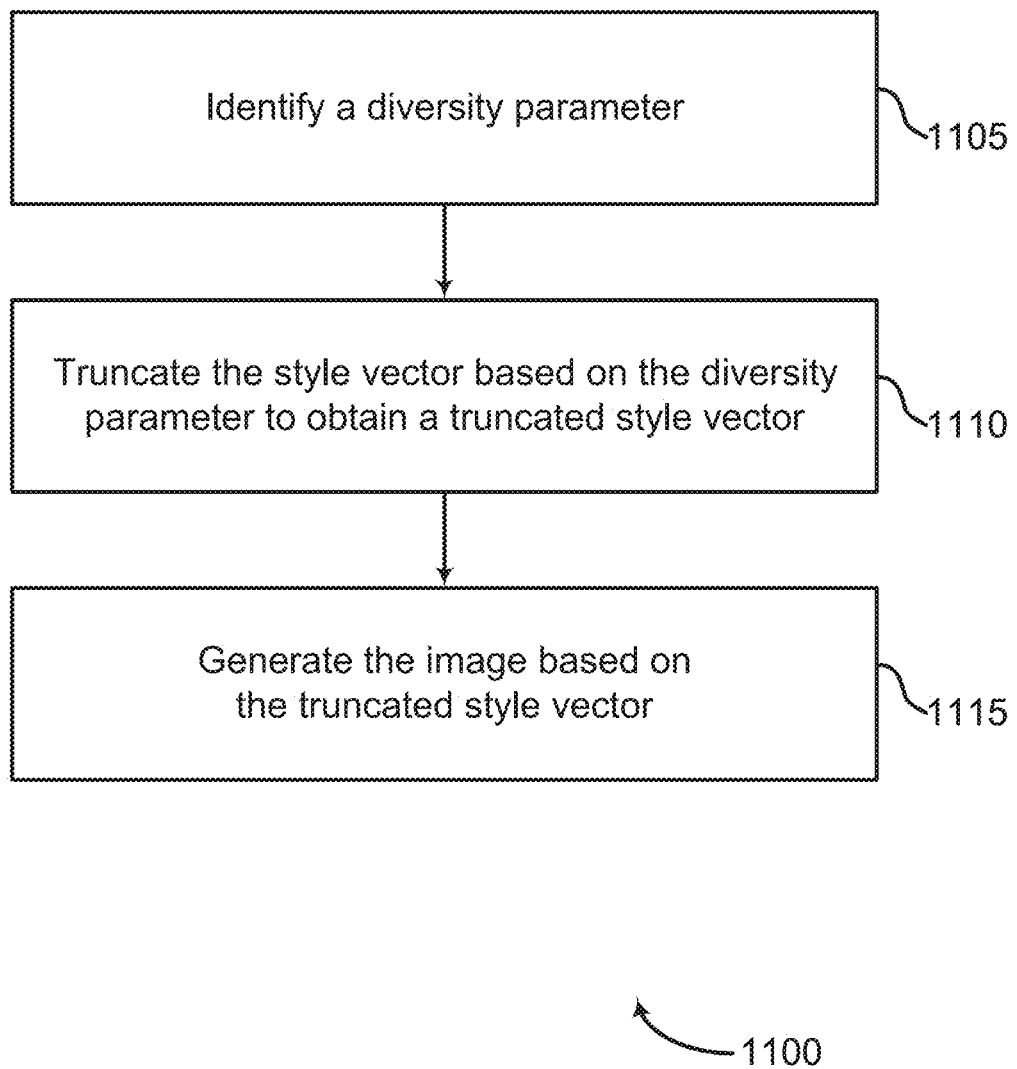
FIG. 11 shows an example of a method for generating an image based on a truncated style vector according to aspects of the present disclosure.

FIG. 11 shows an example of a method 1100 of generating an image based on a truncated style vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, a machine learning model such as the machine learning model described with reference to FIGS. 5 and 7 can leverage a truncation trick at inference time to affect a diversity of generated images.

At operation 1105, the system identifies a diversity parameter. In some cases, the operations of this step refer to, or may be performed by, a mapping network as described with reference to FIGS. 5 and 7. In some cases, the diversity parameter p comprises a value inclusively between 1 and 0. In some cases, the mapping network receives the value for the diversity parameter p from a user via a user input provided to a user interface, such as the user interface described with reference to FIGS. 1 and 3.

At operation 1110, the system truncates the style vector based on the diversity parameter to obtain a truncated style vector. In some cases, the operations of this step refer to, or may be performed by, a mapping network as described with reference to FIGS. 5 and 7. For example, in some cases, the mapping network truncates a style vector w described with reference to FIG. 8 to obtain a truncated style vector $w_{trunc} = \text{lerp}(w_{mean}, w, \psi)$ where $w_{mean}$ is a mean of a style vector w of an entire dataset. In some cases, $w_{mean}$ is precomputed.

In some cases, a truncated style vector $w_{trunc}$ is obtained by interpolating the latent code toward both the mean of the entire distribution as well as the mean of w conditioned on the text prompt:

$$w_{trunc} = \text{lerp}(w_{mean,c}, \text{lerp}(w_{mean}, w, \psi)\psi) \quad (5)$$

In some cases, $w_{mean,c}$ is computed at inference time by parallelly sampling $w = M(z, c)$ 16 times with a same c and taking an average. In some cases, this operation is computationally light, as most of the computational overhead is caused by the image generation network, not the mapping network M.

At operation 1115, the system generates the image based on the truncated style vector. In some cases, the operations of this step refer to, or may be performed by, an image generation network as described with reference to FIGS. 5, 7, and 14. For example, in some cases, the image generation network generates the image as described with reference to FIG. 7 by modulating the convolution process of the image generation network using the truncated style vector $w_{trunc}$.

In some cases, the machine learning model uses the truncation trick (e.g., truncates the style vector) to trade diversity for fidelity by interpolating a latent vector to a mean of a distribution and thereby making an output image more typical. For example, when the diversity parameter $\psi = 1$, $w_{mean}$ is not used, and therefore no truncation occurs. when the diversity parameter $\psi = 0$, the style vector w collapses to the mean, losing diversity. Examples of the effects of changing a value of the diversity parameter $\psi$ are described with reference to FIG. 12.

Figure 12:
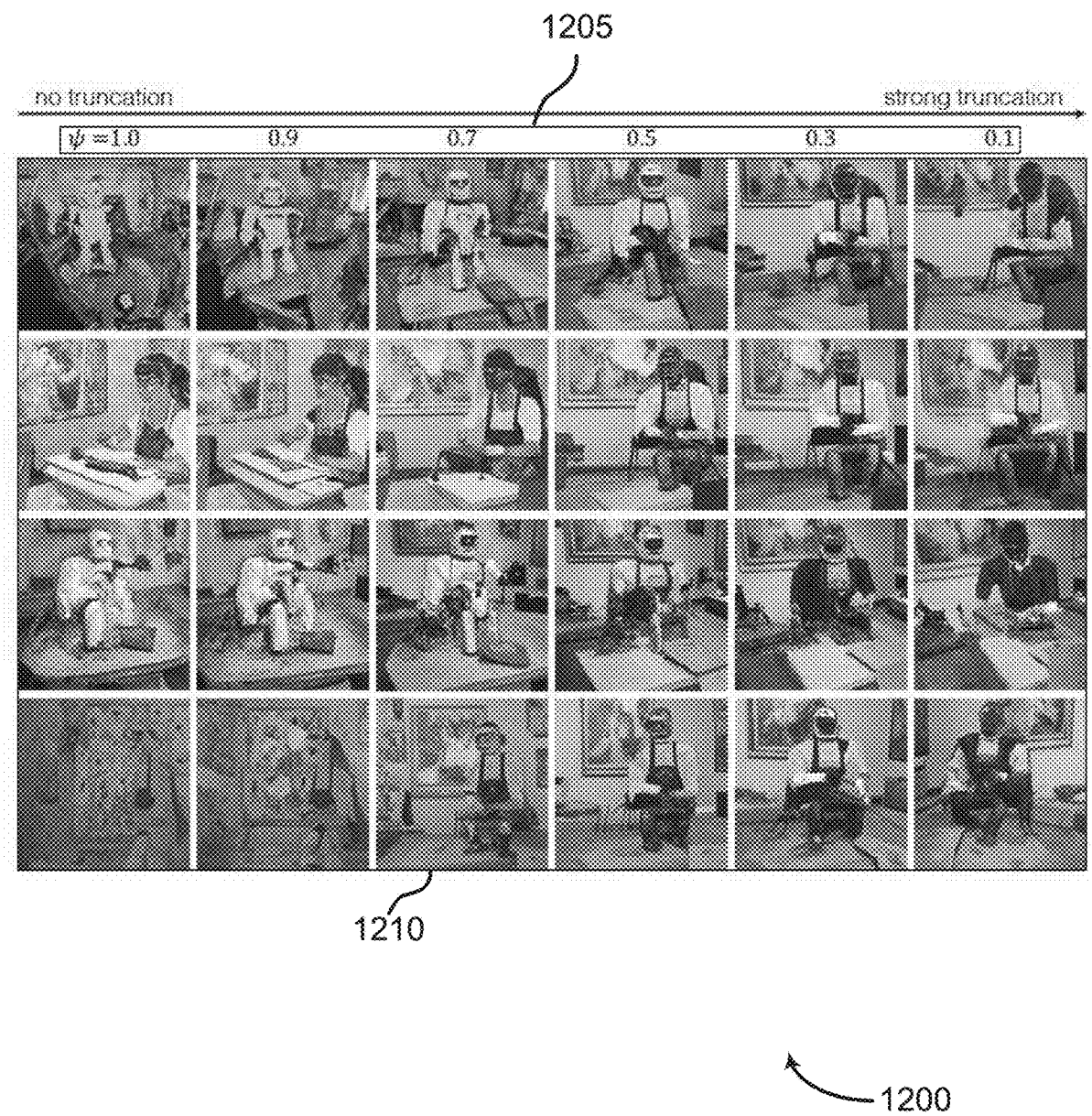
FIG. 12 shows an example of images generated based on style vector truncation according to aspects of the present disclosure.

FIG. 12 shows an example of images generated based on style vector truncation according to aspects of the present disclosure. The example shown includes truncation examples 1200, diversity parameter value 1205, and generated images 1210.

Referring to FIG. 12, generated images 1210 are a set of images generated in response to a text prompt "a robot with a visor and apron painting in an art studio, painting by Renoir", where each column shown corresponds to a different diversity parameter value 1205 as described with reference to FIG. 11. In some cases, each row of generated images 1210 corresponds to a different style vector w.

As shown, when the different diversity parameter $\psi = 1$, no truncation occurs, and each of the images generated at $\psi = 1$ are visually diverse from each other. As diversity value parameter 1205 decreases, so does the corresponding visual diversity among images corresponding to diversity value parameter 1205. Accordingly, in some cases, a user can adjust diversity value parameter 1205 to quickly obtain a set of images of a desired level of visual diversity.

Training

A method for image generation is described with reference to FIGS. 13-14. One or more aspects of the method include obtaining a training dataset including a training image and text describing the training image; generating a predicted style vector based on the text using a mapping network; generating a predicted image based on the predicted style vector using an image generation network; generating an image embedding based on the predicted image and a conditioning embedding based on the text using a discriminator network; and training the image generation network based on the image embedding and the conditioning embedding.

Some examples of the method further include computing a generative adversarial network (GAN) loss based on the image embedding and the conditioning embedding, wherein the image generation network is trained based on the GAN loss.

Some examples of the method further include generating a mixed conditioning embedding based on an unrelated text. Some examples further include computing a mixing loss based on the image embedding and the mixed conditioning embedding, wherein the image generation network is trained based on the mixing loss.

Some examples of the method further include encoding the text using a text encoder network that includes a pre-trained encoder and a learned encoder, wherein the learned encoder is trained together with the image generation network. Some examples of the method further include learning a feature map for an initial input to the image generation network.

Figure 13:
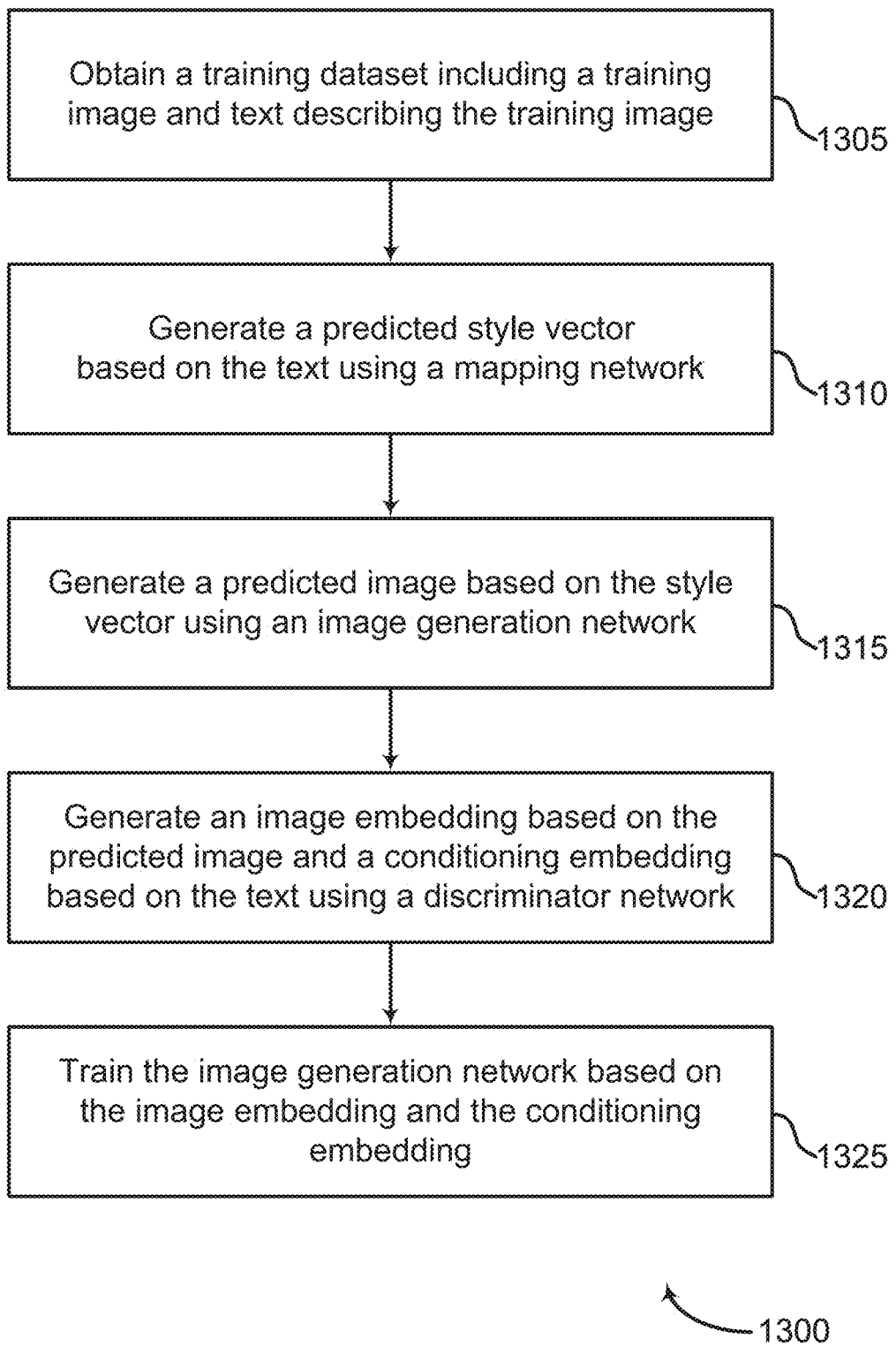
FIG. 13 shows an example of a method for training an image generation network according to aspects of the present disclosure.

FIG. 13 shows an example of a method 1300 for training an image generation network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, a machine learning model (such as the machine learning model described with reference to FIGS. 5 and 7) is trained using a discriminator network D(x, c) to judge a realism of an image generated by an image generation network as compared to a sample from a training dataset $\mathcal{D}$ including image-text pairs.

At operation 1305, the system obtains the training dataset $\mathcal{D}$ including a training image and text describing the training image. In some cases, the operations of this step refer to, or may be performed by, a training component as described with reference to FIGS. 5 and 14. In some cases, the training component retrieves the training dataset $\mathcal{D}$ from a database (such as the database described with reference to FIG. 1). In some cases, the training component receives the training dataset $\mathcal{D}$ from a user (such as the user described with reference to FIG. 1).

At operation 1310, the system generates a predicted style vector w based on the text using a mapping network. In some cases, the operations of this step refer to, or may be performed by, a mapping network as described with reference to FIGS. 5 and 7. For example, in some cases, a text encoder network (such as the text encoder network described with reference to FIGS. 5 and 7) encodes the text to obtain a conditioning vector c, a set of local vectors, a global vector, or a combination thereof as described with reference to FIG. 8. In some cases, the mapping network generates a predicted style vector w based on the global vector and a sampled latent code in a similar manner as described with reference to FIG. 8.

At operation 1315, the system generates a predicted image x based on the predicted style vector w using an image generation network. In some cases, the operations of this step refer to, or may be performed by, an image generation network as described with reference to FIGS. 5, 7, and 14. For example, in some cases, the image generation network generates a style vector w based on the text in a similar manner as described with reference to FIG. 8.

At operation 1320, the system generates an image embedding based on the predicted image and a conditioning embedding based on the text using a discriminator network. In some cases, the operations of this step refer to, or may be performed by, a discriminator network as described with reference to FIG. 5.

According to some aspects, the discriminator network comprises self-attention layers without conditioning. In some cases, to incorporate conditioning in the self-attention layers, the machine learning model leverages a modified projection-based discriminator. For example, in some cases, the discriminator network $D(\cdot,\cdot)$ comprises a convolutional branch $\phi(\cdot)$ and a conditioning branch $\psi(\cdot)$. In some cases, the convolutional branch $\phi(\cdot)$ generates the image embedding $\phi(x)$ using the predicted image x. In some cases, the conditioning branch $\psi(\cdot)$ generates the conditioning embedding $\psi(c)$ using the conditioning vector c. In some cases, a prediction of the discriminator network is the dot product of the image embedding $\phi(x)$ and the conditioning embedding $\psi(c)$:

$$D(x, c) = \phi(x)^T \psi(c) \qquad (6)$$

At operation 1325, the system trains the image generation network based on the image embedding and the conditioning embedding. In some cases, the operations of this step refer to, or may be performed by, a training component as described with reference to FIGS. 5 and 14. For example, in some cases, the training component trains the image generation network as described with reference to FIG. 14.

According to some aspects, the image generation network is used in an image upsampling context. In an example, a high-capacity 64-pixel base machine learning model is learned, and then a 64-pixel to 512-pixel GAN-based upsampler is trained. Accordingly, by training a text-conditioned image generation pipeline in two separate stages, a higher-capacity 64-pixel base model is accomplished using same computing resources.

In some cases, in the upsampler, the image generation network is implemented as an asymmetric U-Net architecture, in which a 64-pixel input goes through three downsampling residual blocks and then six upsampling residual blocks comprising attention layers to produce the 512-pixel image. In some cases, skip connections at a same resolution are included. In some cases, the upsampler is trained using the same losses as the base machine learning model, as well as the LPIPS Perceptual Loss with respect to the ground truth high-resolution image. Vision-aided GAN was not used for the upsampler. In some cases, the upsampler is also trained and inferenced with moderate Gaussian noise augmentation, with the goal of reducing a gap between real and GAN-generated images. In some cases, the upsampler can be used in conjunction with existing diffusion models, which typically also use the 64-pixel base model. In some cases, the upsampler can boost an inference speed of diffusion upsamplers by orders of magnitude.

Figure 14:
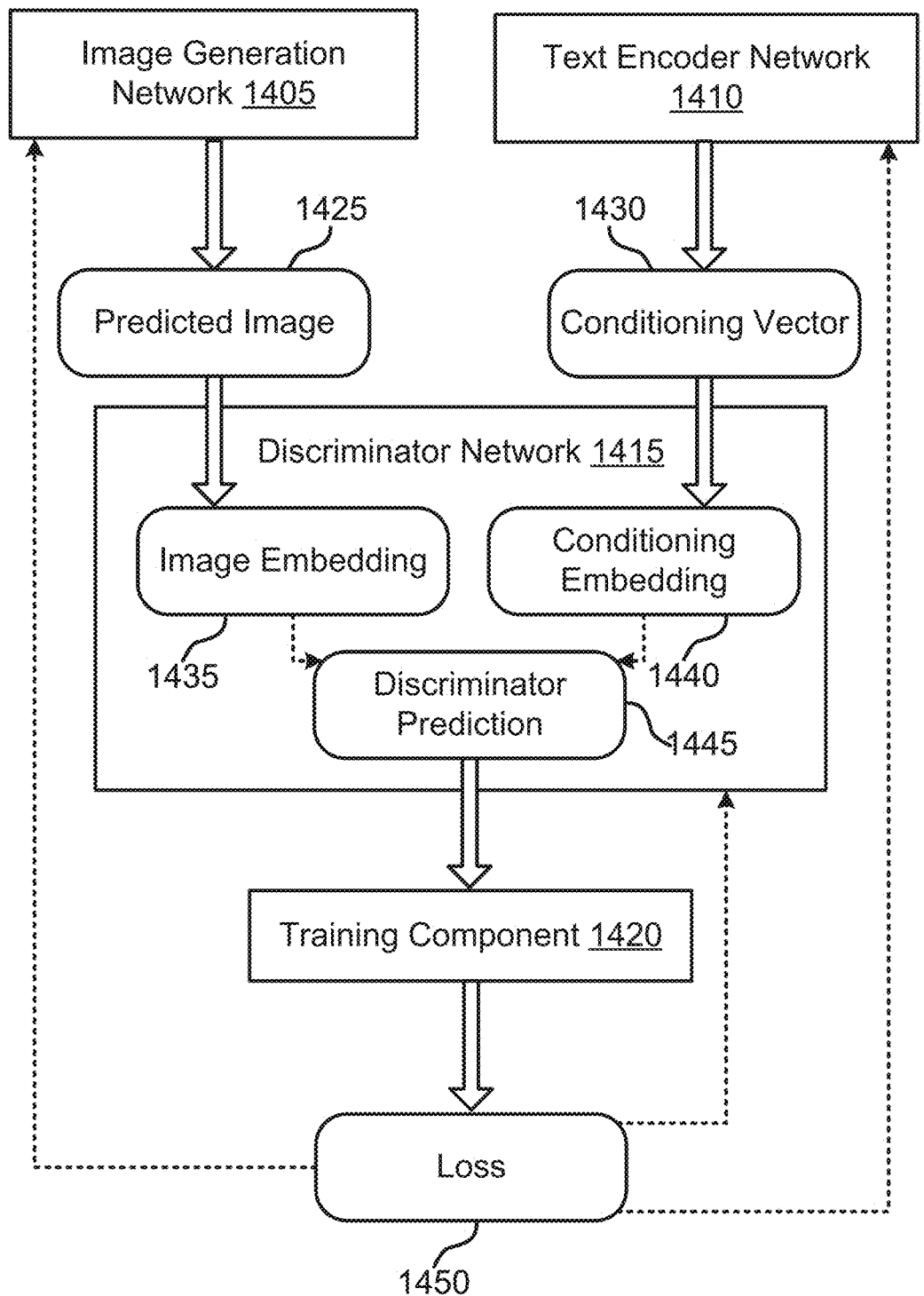
FIG. 14 shows an example of training a machine learning model according to aspects of the present disclosure.

FIG. 14 shows an example 1400 of training a machine learning model according to aspects of the present disclosure. The example shown includes image generation network 1405, text encoder 1410, discriminator network 1415, training component 1420, predicted image 1425, conditioning vector 1430, image embedding 1435, conditioning embedding 1440, discriminator prediction 1445, and loss 1450.

Referring to FIG. 14, in some cases, discriminator network 1415 generates image embedding 1435 based on predicted image 1425 provided by image generation network 1405 and generates conditioning embedding 1440 based on conditioning vector 1430 provided by text encoder network 1410 as described with reference to FIG. 13. In some cases, discriminator network 1415 determines discriminator prediction 1445 based on image embedding 1435 and conditioning embedding 1440 as described with reference to FIG. 13.

According to some aspects, training component computes one or more losses 1450 according to one or more loss functions based on discriminator prediction 1445. The term "loss function" refers to a function that impacts how a machine learning model is trained in a supervised learning model. Specifically, during each training iteration, the output of the model is compared to the known annotation information in the training data. The loss function provides a value (the "loss") for how close the predicted annotation data is to the actual annotation data. After computing the loss function, the parameters of the model are updated accordingly, and a new set of predictions are made during the next iteration.

For example, in some cases, training component 1420 computes a generative adversarial network (GAN) loss (e.g., loss 1450) based on image embedding 1435 and conditioning embedding 1440:

$$\mathcal{L}_{GAN,real} = \mathbb{E}_{x,c \sim p_{data}}\left[\log\left(1 + \exp\left(-\phi(x)^T \psi(c)\right)\right)\right] \quad (7)$$

$$\mathcal{L}_{GAN,fake} = \mathbb{E}_{x,c \sim p_{fake}}\left[\log\left(1 + \exp\left(\phi(x)^T \psi(c)\right)\right)\right] \quad (8)$$

In some cases, the GAN loss is a non-saturating GAN loss. In some cases, training component 1420 updates the image generation parameters of image generation network 1405 by backpropagating the GAN loss through image generation network 1405. In some cases, training component 1420 updates the discriminator parameters of discriminator network 1415 by backpropagating the GAN loss through discriminator network 1415.

According to some aspects, the pretrained encoder of text encoder 1410 described with reference to FIG. 5 is frozen during training. According to some aspects, a series of linear layers comprised in the learned encoder described with reference to FIG. 5 is trained together with image generation network 1405 using the GAN loss. According to some aspects, the series of linear layers are connected to convolution layers of the pretrained encoder. In some cases, by training the learned encoder together with image generation network 1405, a vision-aided discriminator is provided that allows for backpropagation of more-informative gradients to image generation network 1405, which increases a quality of an image generated by image generation network 1405.

In some cases, discriminator network 1415 generates a mixed conditioning embedding based on an unrelated text. For example, in some cases, discriminator prediction 1445 is a measurement of how much the image x aligns with the conditioning vector c. However, in some cases, discriminator prediction 1445 may be made without considering condition due to a collapse of conditioning embedding 1440 to a same constant irrespective of conditioning vector 1430. Accordingly, in some cases, to force discriminator network 1415 to use conditioning, a text $x_i$ is matched with an unrelated condition vector $c_{j \neq i}$ taken from another sample in a minibatch $\{(x_i, c_i)\}_i^N$ of the training dataset $\mathcal{L}$ described with reference to FIG. 13, and the text $x_i$ and the unrelated condition vector $c_j$ are presented as fakes. In some cases, the discriminator network generates the mixed conditioning embedding $\psi(c_j)$ based on the unrelated condition vector $c_j$.

In some cases, training component 1420 computes a mixing loss $\mathcal{L}_{mixaug}$ (e.g., loss 1450) based on the image embedding $\phi(x)$ and the mixed conditioning embedding $\psi(c_j)$:

$$\mathcal{L}_{mixaug} = \mathbb{E}_{\{(x_i,c_i)\}_i^N \sim p_{data}}\left[\frac{1}{N-1}\sum_{j \neq i}\log\left(1 + \exp\left(-\phi(x_i)^T \psi(c_j)\right)\right)\right] \quad (9)$$

In some cases, the mixing loss $\mathcal{L}_{mixaug}$ is comparable to a repulsive force of contrastive learning, which encourages embeddings to be uniformly spread across a space. In some cases, training component 1420 updates the image generation parameters of image generation network 1405 according to the mixing loss mixaug. In some cases, both contrastive learning and learning using the mixing loss $\mathcal{L}_{mixaug}$ would act to minimize similarity between an unrelated x and c, but differ in that the logit of the mixing loss $\mathcal{L}_{mixaug}$ in equation (9) is not pooled with other pairs inside the logarithm, thereby encouraging stability, as it is not affected by hard negatives of the minibatch.

Accordingly, in some cases, loss 1450 comprises $\mathcal{L}_{GAN,real}$, $\mathcal{L}_{GAN,fake}$, $\mathcal{L}_{mixaug}$, or a combination thereof.

Image generation network 1405 is an example of, or includes aspects of, the corresponding element described with reference to FIGS. 5 and 7. Text encoder network 1410 is an example of, or includes aspects of, the corresponding element described with reference to FIGS. 5 and 7. Discriminator network is an example of, or includes aspects of, the corresponding element described with reference to FIG. 5. Training component 1420 is an example of, or includes aspects of, the corresponding element described with reference to FIG. 5.

Figure 15:
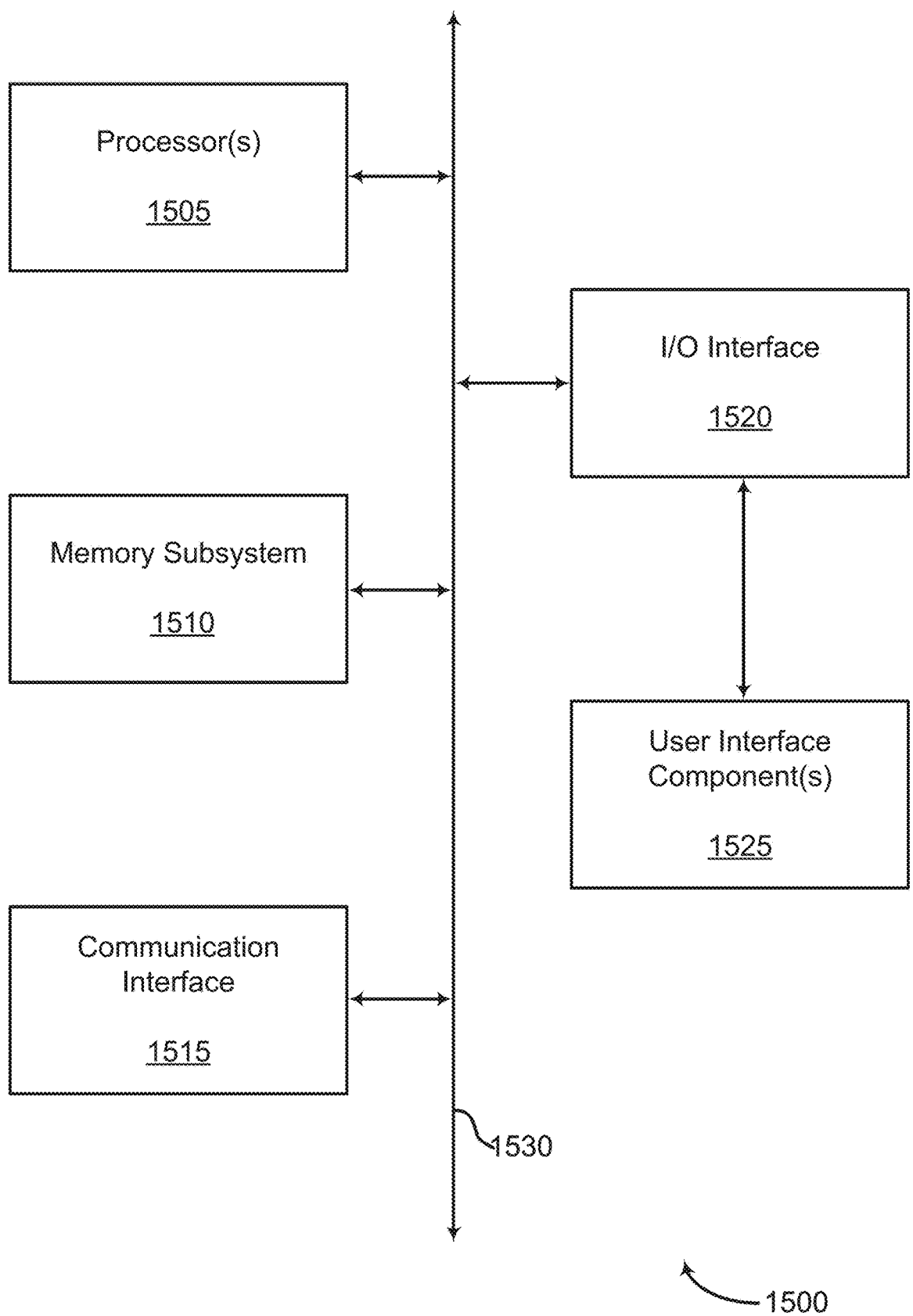
FIG. 15 shows an example of a computing device according to aspects of the present disclosure.

FIG. 15 shows an example of a computing device 1500 for image generation according to aspects of the present disclosure. In one aspect, computing device 1500 includes processor(s) 1505, memory subsystem 1510, communication interface 1515, I/O interface 1520, user interface component(s) 1525, and channel 1530.

In some embodiments, computing device 1500 is an example of, or includes aspects of, the image generation apparatus as described with reference to FIGS. 1 and 5. In some embodiments, computing device 1500 includes one or more processors 1505 that can execute instructions stored in memory subsystem 1510 to obtain a text prompt, generate a style vector based on the text prompt, generate an adaptive convolution filter based on the style vector, and generate an image corresponding to the text prompt based on the adaptive convolution filter.

According to some aspects, processor(s) 1505 are included in the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1510 includes one or more memory devices. Memory subsystem 1510 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote control device interfaced with a user interface directly or through the I/O controller), or a combination thereof. In some cases, user interface component(s) 1525 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
   obtaining a text prompt;
   generating a style vector based on the text prompt;
   generating an adaptive convolution filter by averaging a plurality of weights across a plurality of convolution filters of a convolution layer based on the style vector, wherein the adaptive convolution filter comprises a convolution matrix corresponding to a style of the style vector; and
   generating an image corresponding to the text prompt based on the adaptive convolution filter.

2. The method of claim 1, further comprising:
   encoding the text prompt to obtain a text embedding; and
   transforming the text embedding to obtain a global vector corresponding to the text prompt as a whole and a plurality of local vectors corresponding to individual tokens of the text prompt, wherein the style vector is generated based on the global vector and the image is generated based on the plurality of local vectors.

3. The method of claim 2, further comprising:
   performing a cross-attention process based on the plurality of local vectors, wherein the image is generated based on the cross-attention process.

4. The method of claim 2, further comprising:
   obtaining a noise vector, wherein the style vector is based on the noise vector.

5. The method of claim 1, further comprising:
   initializing a feature map; and
   performing a convolution process on the feature map based on the adaptive convolution filter, wherein the image is generated based on the convolution process.

6. The method of claim 5, further comprising:
   performing a self-attention process based on the feature map, wherein the image is generated based on the self-attention process.

7. The method of claim 6, wherein:
   the self-attention process is based on an L2 distance.

8. The method of claim 1, further comprising:
   identifying a plurality of predetermined convolution filters; and
   combining the plurality of predetermined convolution filters based on the style vector to obtain the adaptive convolution filter.

9. The method of claim 1, further comprising:
   identifying a diversity parameter; and
   truncating the style vector based on the diversity parameter to obtain a truncated style vector, wherein the image is generated based on the truncated style vector.

10. An apparatus for image generation, comprising:
    at least one processor;
    at least one memory storing instructions executable by the at least one processor;
    the apparatus further comprising a text encoder network comprising encoder parameters stored in the at least one memory, wherein the text encoder network is configured to encode a text prompt to obtain a global vector corresponding to the text prompt and a plurality of local vectors corresponding to individual tokens of the text prompt;
    a mapping network comprising mapping parameters stored in the at least one memory, wherein the mapping network is configured to generate a style vector based on the global vector and a noise vector; and
    an image generation network comprising image generation parameters stored in the at least one memory, wherein the image generation network is configured to generate an image corresponding to the text prompt based on the style vector and the plurality of local vectors.

11. The apparatus of claim 10, wherein:
    the text encoder network comprises a pretrained encoder and a learned encoder that is trained together with the image generation network.

12. The apparatus of claim 10, wherein:
    the image generation network comprises a generative adversarial network (GAN).

13. The apparatus of claim 10, wherein:
    the image generation network includes a convolution layer, a self-attention layer, and a cross-attention layer.

14. The apparatus of claim 10, wherein:
    the image generation network includes an adaptive convolution component configured to generate an adaptive convolution filter based on the style vector, wherein the image is generated based on the adaptive convolution filter.

15. The apparatus of claim 10, further comprising:
    a discriminator network configured to generate an image embedding and a conditioning embedding, wherein the discriminator network is trained together with the image generation network using an adversarial training loss based on the image embedding and the conditioning embedding.

16. A method for image generation, comprising:
    obtaining a training dataset including a training image and text describing the training image;
    generating a predicted style vector based on the text and a noise vector using a mapping network;
    generating a predicted image based on the predicted style vector using an image generation network;
    generating an image embedding based on the predicted image and a conditioning embedding based on the text using a discriminator network; and
    training the image generation network based on the image embedding and the conditioning embedding.

17. The method of claim 16, further comprising:
    computing a generative adversarial network (GAN) loss based on the image embedding and the conditioning embedding, wherein the image generation network is trained based on the GAN loss.

18. The method of claim 16, further comprising:
    generating a mixed conditioning embedding based on an unrelated text; and
    computing a mixing loss based on the image embedding and the mixed conditioning embedding, wherein the image generation network is trained based on the mixing loss.

19. The method of claim 16, further comprising:
    encoding the text using a text encoder network that includes a pretrained encoder and a learned encoder, wherein the learned encoder is trained together with the image generation network.

20. The method of claim 16, further comprising:
    learning a feature map for an initial input to the image generation network.

* * * * *